US008860665B2

(12) United States Patent
Sudo

(10) Patent No.: US 8,860,665 B2
(45) Date of Patent: Oct. 14, 2014

(54) CHARACTER INPUT DEVICE AND CHARACTER INPUT METHOD

(75) Inventor: Tomohiro Sudo, Yokohama (JP)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 13/320,628

(22) PCT Filed: Apr. 26, 2011

(86) PCT No.: PCT/JP2011/060174
§ 371 (c)(1),
(2), (4) Date: Nov. 15, 2011

(87) PCT Pub. No.: WO2011/136227
PCT Pub. Date: Nov. 3, 2011

(65) Prior Publication Data
US 2012/0056814 A1    Mar. 8, 2012

(30) Foreign Application Priority Data

Apr. 26, 2010 (JP) ................................ 2010-101520

(51) Int. Cl.
G06F 3/02 (2006.01)
G06F 3/0488 (2013.01)

(52) U.S. Cl.
CPC ........ G06F 3/04886 (2013.01); G06F 3/04883 (2013.01)
USPC ........... 345/168; 345/173; 715/863; 715/810; 382/186

(58) Field of Classification Search
CPC . G06F 3/0236; G06F 3/0233; G06F 3/04883; G06F 3/0482
USPC ................. 345/156, 168–184; 382/181–189; 715/863, 810
See application file for complete search history.

(56) References Cited

U.S. PATENT DOCUMENTS

| 5,276,794 | A  | * | 1/1994  | Lamb, Jr. ...................... 715/202 |
| 6,611,258 | B1 | * | 8/2003  | Tanaka et al. ................. 345/179 |
| 6,952,198 | B2 | * | 10/2005 | Hansen .......................... 345/158 |
| 7,911,452 | B2 | * | 3/2011  | Kang et al. .................... 345/173 |

(Continued)

FOREIGN PATENT DOCUMENTS

| JP | 10207607   | 8/1988 |
| JP | 11-053116 A | 2/1999 |

(Continued)

OTHER PUBLICATIONS

International Search Report for PCT/JP2011/060174 mailed Jul. 12, 2011.

(Continued)

Primary Examiner — Priyank Shah
(74) Attorney, Agent, or Firm — Lowe Hauptman & Ham, LLP

(57) ABSTRACT

According to one embodiment, a character input device includes a touch panel and a control unit. The touch panel detects contact with respect to a surface thereof. The control unit performs, when detection of contact is started on the touch panel, character recognition processing based on a trajectory connecting each position at which the contact is detected. The control unit displays, when a character is recognized by the character recognition processing, a virtual keyboard on a display surface of the touch panel to receive input of a character from the virtual keyboard.

11 Claims, 19 Drawing Sheets

(56) References Cited

U.S. PATENT DOCUMENTS

| | | | |
|---|---|---|---|
| 2005/0146508 A1* | 7/2005 | Kirkland et al. | 345/169 |
| 2007/0171210 A1* | 7/2007 | Chaudhri et al. | 345/173 |
| 2008/0016439 A1* | 1/2008 | Leung et al. | 715/268 |
| 2009/0150776 A1* | 6/2009 | Feldman et al. | 715/702 |
| 2010/0095205 A1 | 4/2010 | Kinoshita | |
| 2010/0125787 A1* | 5/2010 | Chihara et al. | 715/702 |
| 2010/0141590 A1* | 6/2010 | Markiewicz et al. | 345/173 |
| 2010/0169841 A1* | 7/2010 | Singh | 715/863 |
| 2010/0323762 A1* | 12/2010 | Sindhu | 455/566 |
| 2011/0066984 A1* | 3/2011 | Li | 715/863 |
| 2011/0102570 A1* | 5/2011 | Wilf et al. | 348/77 |
| 2011/0258565 A1* | 10/2011 | Arscott et al. | 715/763 |

FOREIGN PATENT DOCUMENTS

| | | | |
|---|---|---|---|
| JP | 2003-141448 A | 5/2003 | |
| JP | 2005-085242 A | 3/2005 | |
| JP | 2005-196759 A | 7/2005 | |
| JP | 2008-108233 A | 5/2008 | |
| JP | 2010271760 | 12/2010 | |

OTHER PUBLICATIONS

JP Office Action dated Nov. 15, 2011 of JP Application No. 2010-101520.

Japanese Office Action for Application No. JP2010-101520 mailed Feb. 7, 2012.

* cited by examiner

| CHARACTER | Q | W | E | ... |
|---|---|---|---|---|
| x | 10 | 32 | 54 | ... |
| y | 10 | 10 | 10 | ... |
| WIDTH | 20 | 20 | 20 | ... |
| HEIGHT | 40 | 40 | 40 | ... |

FIG.13

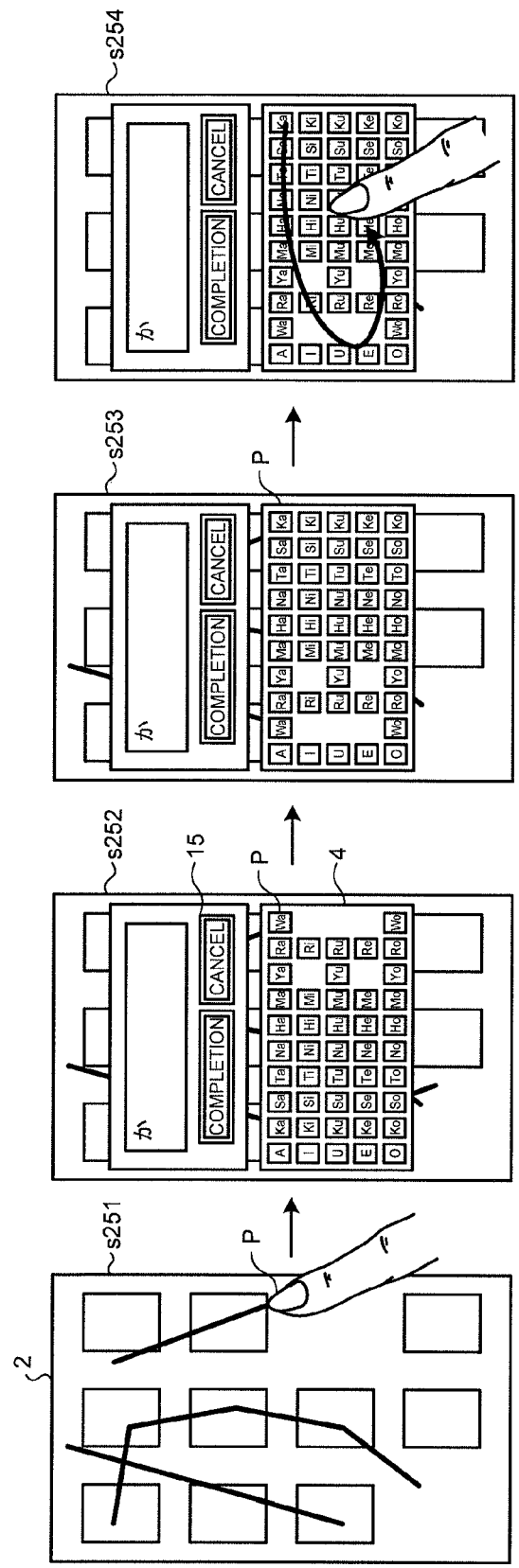

CHARACTER INPUT DEVICE AND CHARACTER INPUT METHOD

CROSS-REFERENCE TO RELATED APPLICATION

The present application is a National Stage of International Application Number PCT/JP2011/060174 filed on Apr. 26, 2011 and claims priority from, Japanese Patent Application No. 2010-101520, filed on Apr. 26, 2010.

FIELD

The present invention relates to a character input device and a character input method.

BACKGROUND

In recent years, touch panels have been widely used in order to enable an intuitive operation and achieve a compact character input device without a device requiring a physically large area, such as a keyboard. As a method for inputting a character by using a touch panel, a hand-writing method for inputting the form of a character by hand-writing on a touch panel (e.g., Patent Literature 1) and a virtual keyboard method for inputting a character by using a virtual keyboard (hereinafter, referred to as a "virtual keyboard") displayed on a touch panel (e.g., Patent Literature 2) are known.

CITATION LIST

Patent Literature

Patent Literature 1: Japanese Patent Application Laid-open No. 2003-141448
Patent Literature 2: Japanese Patent Application Laid-open No. 2008-108233

Technical Problem

In the hand-writing method, no specific screen such as the virtual keyboard needs to be displayed on the touch panel, whereby it is possible to start input of a character promptly. However, because the form of the character needs to be hand-written one by one, it takes time to input the character. By contrast, in the virtual keyboard method, selecting a button on the virtual keyboard allows a character corresponding to the button to be input, whereby it is possible to input the character at high speed. However, because it is not until the virtual keyboard is displayed on the touch panel that the input of the character is started, start of the input of the character may be delayed.

For the foregoing reasons, there is a need for a character input device and a character input method that make it possible to start input of a character by using a touch panel promptly and to input a character at high speed.

SUMMARY OF THE INVENTION

According to an aspect of the present invention, a character input device includes: a touch panel for detecting contact with respect to a surface thereof; and a control unit for performing, when detection of contact is started on the touch panel, character recognition processing based on a trajectory connecting each position at which the contact is detected. The control unit displays, when a character is recognized by the character recognition processing, a virtual keyboard on a display surface of the touch panel to receive input of a character from the virtual keyboard.

According to another aspect of the present invention, the control unit receives the character recognized by the character recognition processing and the character input from the virtual keyboard as input of a combined, consecutive character string.

According to another aspect of the present invention, the control unit, when the contact on the touch panel is detected in a state of an operation screen being displayed on the touch panel and the character recognition processing is started, defers performing processing corresponding to the operation screen based on a position at which the contact is detected, and performs the processing thus deferred when no character is recognized by the character recognition processing.

According to another aspect of the present invention, the control unit, when the input of the character from the virtual keyboard is completed, displays a screen for receiving selection of processing performed by using the character recognized by the character recognition processing and the character input from the virtual keyboard on the display surface of the touch panel.

According to another aspect of the present invention, the control unit, when the input of the character from the virtual keyboard is completed, performs processing corresponding to the character recognized by the character recognition processing and the character input from the virtual keyboard.

According to another aspect of the present invention, the control unit, when an object displayed on the touch panel is selected in advance, saves a character string obtained by combining the character recognized by the character recognition processing and the character input from the virtual keyboard as attribute information of the object.

According to another aspect of the present invention, the control unit, when a character is recognized by the character recognition processing, adjusts a position at which the virtual keyboard is displayed depending on a position at which a last contact is detected by the touch panel.

According to another aspect of the present invention, the control unit, when the touch panel detects a gesture in which contact is started at a first position on the surface of the touch panel and is terminated at a second position on the surface of the touch panel while the virtual keyboard is being displayed on the display surface of the touch panel, receives a character string including characters corresponding to buttons of the virtual keyboard displayed on a consecutive input trajectory connecting each position at which the contact is detected from when the contact is started at the first position to when the contact is terminated at the second position as input from the virtual keyboard.

According to another aspect of the present invention, the control unit receives the character string including a character corresponding to a button displayed at a position where a specific gesture is detected among the characters corresponding to the buttons displayed on the consecutive input trajectory as the input from the virtual keyboard.

According to another aspect of the present invention, the control unit, when no character is recognized by the character recognition processing, performs processing corresponding to an object displayed on the trajectory.

According to another aspect of the present invention, a character input method is performed by a character input device including a touch panel for detecting contact with respect to a surface thereof. The character input method includes: performing, when detection of contact is started on the touch panel, character recognition processing by a control unit included in the character input device based on a trajectory connecting each position at which the contact is detected; and displaying, when a character is recognized by the character recognition processing, a virtual keyboard on a display surface of the touch panel to receive input of a character from the virtual keyboard by the control unit.

Advantageous Effects of Invention

The character input device and the character input method according to the present invention make it possible to start input of a character by using a touch panel promptly and to input a character at high speed.

BRIEF DESCRIPTION OF DRAWINGS

FIG. 9 is a diagram illustrating an example of virtual keyboard data.

FIG. 13 is a diagram illustrating an example of an input character buffer.

FIG. 20 is a flow diagram illustrating a processing process when display of a virtual keyboard is adjusted in accordance with a position at which the input by the hand-writing method is completed.

DESCRIPTION OF EMBODIMENTS

Exemplary embodiments according to the present invention will be described below in greater detail with reference to the accompanying drawings. It is to be noted that the present invention is not limited by the following explanation. Components in the description below include components that can be assumed easily by those skilled in the art, and components that are substantially identical, that is, components within a so-called equivalent scope. In the description below, a mobile phone terminal will be explained as an example of a character input device. However, a target to which the present invention is applied is not limited to the mobile phone terminal. The present invention can also be applied to various types of devices including a touch panel, such as personal handyphone systems (PHS), personal digital assistants (PDA), portable navigation devices, personal computers, game device, and digital cameras.

Figure 1:
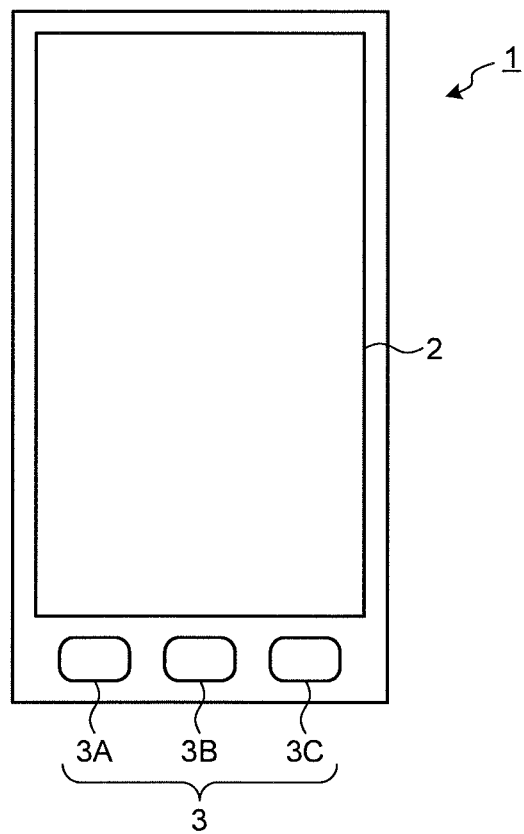
FIG. 1 is a front view of an appearance of a mobile phone terminal.

FIG. 1 is a front view of an appearance of a mobile phone terminal 1 according to an embodiment of a character input device of the present invention. The mobile phone terminal 1 includes a touch panel 2, and an input unit 3 composed of a button 3A, a button 3B, and a button 3C. The touch panel 2 displays a character, a figure, an image, and the like, and detects various types of gestures made with respect to the touch panel 2 using a finger, a stylus, a pen or the like (hereinafter, simply referred to as a "finger"). When any of the buttons are pressed, the input unit 3 activates a function corresponding to the button thus pressed.

When a mobile phone terminal 1 recognizes that a character is input on a touch panel 2 by a hand-writing method, the mobile phone terminal 1 displays a virtual keyboard on the touch panel 2, and receives input of a character from the virtual keyboard. Thus, the input of the character by a virtual keyboard method is received using the input of the character by the hand-writing method as a trigger. As a result, it is possible to combine an advantage of the hand-writing method in that input of a character can be started promptly with an advantage of the virtual keyboard method in that a character can be input at high speed.

Furthermore, the mobile phone terminal 1 receives, as a series of inputs, a character input by the hand-writing method and a character input from the virtual keyboard displayed using the input of the character input by the hand-writing method as a trigger. Thus, the mobile phone terminal 1 receives input of characters including an operation serving as a trigger to display the virtual keyboard, thereby allowing a user to input the characters efficiently without performing wasteful operations.

Operations of the mobile phone terminal 1 when receiving input of characters will be described with reference to examples in FIG. 2 and FIG. 3. At s201, the mobile phone terminal 1 displays an object browsing screen used for browsing objects on the touch panel 2. The object used herein means data on which the mobile phone terminal 1 is to perform various types of processing, such as display, reproduction, and editing, and corresponds to image data, video data, music data, a word processing document, an e-mail, and personal data in an address book, for example. The object browsing screen used herein means a screen on which an icon such as a thumbnail corresponding to an object is displayed so as to select and browse the object.

Icons of objects OB1 to OB10 are displayed on the object browsing screen, and a user puts his/her finger in the display area of the icon of the object OB1 on the touch panel 2 at s202. If the user pulls the finger away from the touch panel 2 in this state, the mobile phone terminal 1 determines that the icon of the object OB1 is tapped, and performs predetermined processing, such as display, reproduction, and editing, on the object OB1.

By contrast, as illustrated in s203, if the user moves the finger out of the display area of the icon of the object OB1 with the finger keeping the touch with the touch panel 2, the mobile phone terminal 1 defers performing processing on the object OB1, and records the trajectory of the movement of the finger. The mobile phone terminal 1 then continues to record the trajectory of the movement of the finger until predetermined conditions are satisfied. As illustrated in s204 and s205, the trajectory detected by the mobile phone terminal 1 during this time includes trajectories obtained by pulling the finger away from the touch panel 2, bringing the finger into contact with another position on the touch panel 2, and moving the finger by the user.

The predetermined conditions on which the mobile phone terminal 1 terminates recording the trajectory of the movement of the finger are conditions on which input of a character is assumed to be completed. The predetermined conditions include a condition that time elapsed since contact of the finger with respect to the touch panel 2 is first detected exceeds a maximum elapsed time and/or a condition that time elapsed since the last time the finger is pulled away from the touch panel 2 exceeds a maximum latency time, for example. The maximum elapsed time used herein means enough time to input a character by the hand-writing method. The maximum latency time used herein means enough time from when input of a stroke by the hand-writing method is completed to when input of the next stroke is started.

If the predetermined conditions are satisfied, the mobile phone terminal 1 performs character recognition processing based on the trajectory thus recorded. If the predetermined conditions are satisfied at the stage of s205, for example, the mobile phone terminal 1 recognizes a character of "KA" in hiragana in Japanese as an input character based on the trajectory thus recorded. The character recognition processing may be realized by any methods. In FIG. 2, the trajectory recorded by the mobile phone terminal 1 is illustrated in a manner superimposed on the object browsing screen. However, it is not required to actually display such a trajectory on the touch panel 2.

If the recognition of the character succeeds based on the trajectory thus recorded, the mobile phone terminal 1 displays a virtual keyboard 4 on the touch panel 2 as illustrated in s206. Furthermore, the mobile phone terminal 1 displays an input character display screen 15 to which a character string being input is output on the touch panel 2, and outputs "KA" thus recognized to the input character display screen 15 as the first input character.

The mobile phone terminal 1 then receives a character input from the virtual keyboard 4 as a character subsequent to the character recognized by the hand-writing method. At s207, the mobile phone terminal 1 receives input of characters of "ME" and "RA" from the virtual keyboard 4, and adds the characters to "KA" recognized by the character recognition processing in a chronological order, thereby outputting a character string of "KAMERA" to the input character display screen 15 as an input character string.

If the mobile phone terminal 1 detects a gesture indicating completion of the input, such as a gesture of the finger coming into contact with the touch panel 2 in a display area of a completion button in the input character display screen 15, the mobile phone terminal 1 performs predetermined processing by using the character string thus received. The predetermined processing herein includes processing for performing an Internet search by using the character string thus received to display search results on the touch panel 2, processing for displaying a send screen for an e-mail using the character string thus received as a body on the touch panel 2, and processing for saving the character string thus received as predetermined data, for example.

Figure 2:
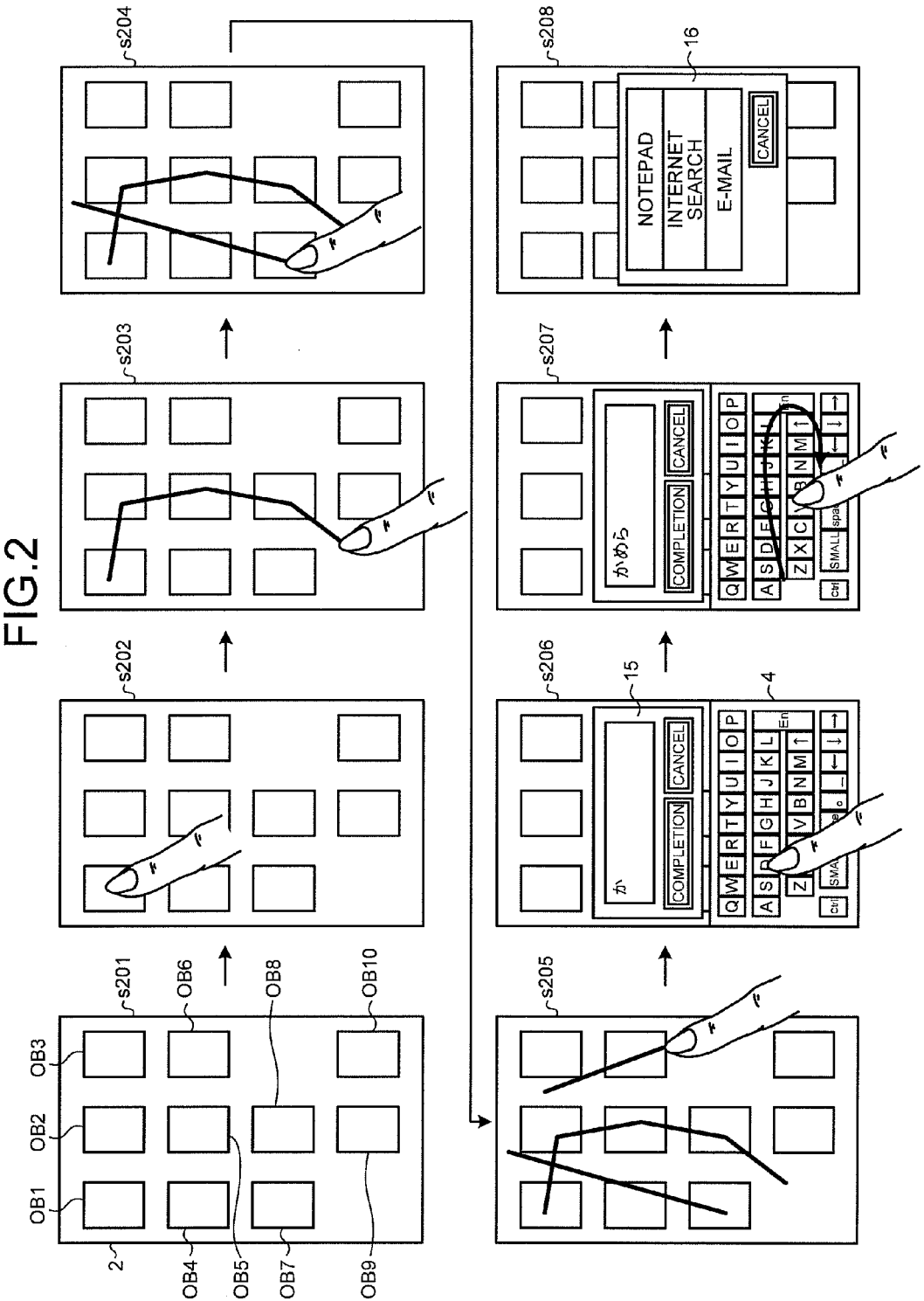
FIG. 2 is a diagram illustrating operations of the mobile phone terminal when input of characters is received.

In the example illustrated in FIG. 2, at s208, the mobile phone terminal 1 displays a processing selection screen 16 for receiving selection of which processing is to be performed by using the character string thus received on the touch panel 2. The processing selection screen 16 includes an option of "notepad", an option of "Internet search", and an option of "e-mail".

If the "notepad" is selected, the mobile phone terminal 1 saves the character string thus received as data treated by a notepad program capable of displaying/editing arbitrary text data. If the "Internet search" is selected, the mobile phone terminal 1 performs an Internet search by using the character string thus received, and displays search results on the touch panel 2. If the "e-mail" is selected, the mobile phone terminal 1 displays a send screen for an e-mail using the character string thus received as a body on the touch panel 2.

If any of the options is selected, the mobile phone terminal 1 performs processing corresponding to the option thus selected, and returns to the state of s201 prior to start of inputting a character. The processing selection screen 16 illustrated in FIG. 2 is just an example, and may be a screen that displays other options. Furthermore, the processing selection screen 16 may be configured such that the options to be displayed are changed depending on the screen displayed on the touch panel 2 at the start of inputting a character.

Operations when the character recognition processing fails will now be described. As illustrated in FIG. 3, if the predetermined conditions are satisfied at the stage where a stroke that does not constitute a character is input as illustrated in s209 from the state of s204, the mobile phone terminal 1 performs the character recognition processing based on the trajectory thus recorded. In this case, no character is recognized. If no character is recognized by the character recognition processing, it is assumed that the operation is performed by the user not for inputting a character.

Therefore, if no character is recognized, the mobile phone terminal 1 performs usual processing to be performed in the case where the movement of the finger recorded as the trajectory is made with respect to the screen displayed on the touch panel 2 at the start of tracing the trajectory. In the example illustrated in FIG. 3, the mobile phone terminal 1 causes all the icons displayed on the trajectory thus recorded to be in a selected state as illustrated in s210, and starts an application that performs processing corresponding to the icons caused to be in the selected state as illustrated in s211.

The processing corresponding to the icons displayed on the trajectory thus recorded may be performed on all the icons displayed on the trajectory thus recorded, may be performed only on the icon whose display area is passed across by the finger first, or may be performed only on the icon whose display area is passed across by the finger last.

As described above, if a character is input by the hand-writing method on the touch panel 2, the mobile phone terminal 1 displays the virtual keyboard 4 on the touch panel 2, and receives the character input by the hand-writing method and a character input by the virtual keyboard method as input. Therefore, the user can enjoy both the advantage of the hand-writing method in that input of a character can be started promptly and the advantage of the virtual keyboard method in that a character can be input at high speed without extra operations.

Furthermore, as described above, even in a screen not specifically prepared for inputting a character, such as the object browsing screen, if a gesture of the finger sliding on the touch panel 2 is detected, the mobile phone terminal 1 defers performing functions specific to the screen, and receives input of characters. The mobile phone terminal 1 then uses the character string thus received to perform processing selected on the processing selection screen 16. Therefore, the user can perform input of characters and processing using the characters thus input on an arbitrary screen. In the description above, the example in which Japanese is input has been explained. However, the character input method according to the present embodiment can be applied to the case where a character in a language other than Japanese is input. In the case where a character in English is input, for example, when the first alphanumeric character or symbol input by the hand-writing method is recognized by the character recognition processing, the virtual keyboard 4 may be displayed on the touch panel 2 to input a character subsequent thereto. Alternatively, in the case where a character in English is input, when the first word input by the hand-writing method is recognized by the character recognition processing, the virtual keyboard 4 may be displayed on the touch panel 2 to input a character subsequent thereto.

When receiving input of characters from the virtual keyboard 4, the mobile phone terminal 1 receives input of the characters not only by a method in which buttons in the virtual keyboard 4 are tapped one by one, but also by a consecutive method. The consecutive method used herein means a method for allowing the user to input a plurality of characters consecutively by moving the finger on the virtual keyboard 4 with the finger keeping the touch with the touch panel 2. In the consecutive method, for example, the user moves the finger in a sliding manner in order of a button "W", a button "E", and a button "T" with the finger keeping the touch with the touch panel 2, thereby inputting a character string "WET".

As described above, in the consecutive method, only by moving the finger on the touch panel 2 in the sliding manner, the user can input a plurality of characters without making a gesture of moving the finger up and down for each button. Accordingly, the user can input the characters at extremely high speed.

In the consecutive method, however, for each button arranged on the trajectory along which the user moves the finger, it is required to determine whether the user intentionally touches the button to input a character corresponding thereto, or whether the user moves the finger across the button only to move the finger to another button. For example, an assumption is made that the virtual keyboard 4 has the QWERTY arrangement, and that the user desires to input the word "WET" described above. In this case, when moving from the button "E" to the button "T", the finger of the user passes across a button "R" arranged therebetween. As a result, if it fails to be determined that the user touches the button "R" not intentionally, a character string "WERT" is received as input despite the intention of the user.

Therefore, the mobile phone terminal 1 determines a button displayed at a position where the touch panel 2 detects a specific gesture to be a button intentionally touched by the user to input a character among buttons arranged on the trajectory along which the user moves the finger. Specifically, in the case where the touch panel 2 detects a gesture of starting touch of the finger, if a button is present at the position where the start of the touch is detected, the mobile phone terminal 1 determines the button to be intentionally touched. Furthermore, in the case where the touch panel 2 detects a gesture of finishing the movement of the finger and pulling the finger away from the touch panel 2, if a button is present at the position where the termination of the touch is detected, the mobile phone terminal 1 determines the button to be intentionally touched.

Furthermore, in the case where the touch panel 2 detects a gesture of changing the direction of movement of the finger with the finger keeping the touch with the touch panel 2, if a button is present at the position where the change of the direction of movement is detected, the mobile phone terminal 1 determines the button to be intentionally touched. Specifically, the mobile phone terminal 1 compares the direction of movement when the finger enters the button and the direction of movement when the finger leaves the button. If the angular difference between the directions of the movements is larger than a threshold value, the mobile phone terminal 1 determines the button to be intentionally touched by the user.

Figure 4:
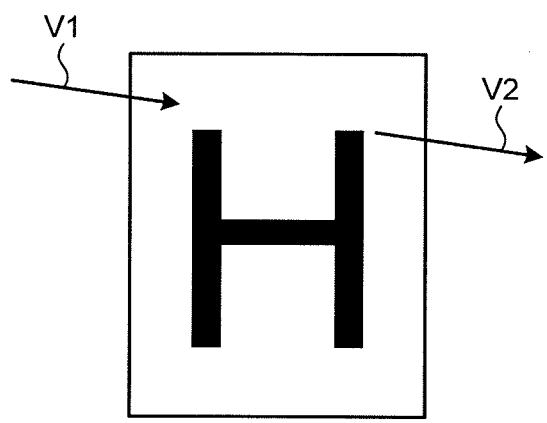
FIG. 4 is a diagram illustrating an example in which a finger passes across a button area.
Figure 5:
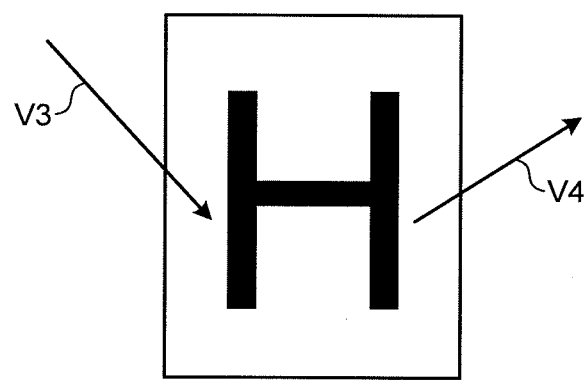
FIG. 5 is a diagram illustrating an example in which a direction of movement of the finger is changed in the button area.

This is because, while the finger is moving to another button, and only passing across a button, the finger moves on the button in one direction, and the angular difference between V1 indicating the direction of movement (vector) when entering the button and V2 indicating the direction of movement when leaving the button is assumed to be small as illustrated in FIG. 4. Furthermore, this is because, if the angular difference between V3 indicating the direction of movement when entering the button and V4 indicating the direction of movement when leaving the button is large as illustrated in FIG. 5, it is highly possible that the user intentionally touches the button, and changes the direction of movement to touch another button. In other words, it can be determined that the button is one of target buttons.

Figure 6:
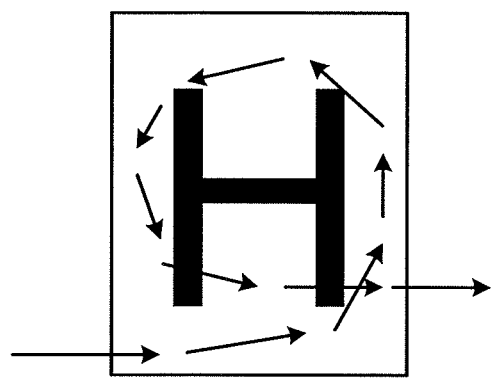
FIG. 6 is a diagram illustrating an example in which the finger draws a rotational trajectory in the button area.

Furthermore, if the touch panel 2 detects a gesture of moving the finger drawing a rotational trajectory in a button area with the finger keeping the touch with the touch panel 2 as illustrated in FIG. 6, the mobile phone terminal 1 determines that the user intentionally touches the button. This is because, if the finger only passes across the button, the finger is not assumed to move drawing such a trajectory. The trajectory is not limited to the rotational trajectory. Alternatively, the mobile phone terminal 1 may determine that the user intentionally touches the button if the finger draws a trajectory of a characteristic shape, such as a mountain shape and a wave shape, in the button area.

As described above, if movement of the finger drawing a trajectory of a characteristic shape in a button area is detected, it is determined that the button is intentionally touched. This allows the user to input the same character consecutively in a simple manner. If the user desires to input a character "W" three times consecutively, for example, the user needs only to move the finger such that the finger draws a circle three times in a button area of "W". At this time, for example, every time the total angle of the movement vector of the finger in the button area exceeds 360 degrees, one rotation is counted. Thus, the number of rotations can be counted.

Figure 7:
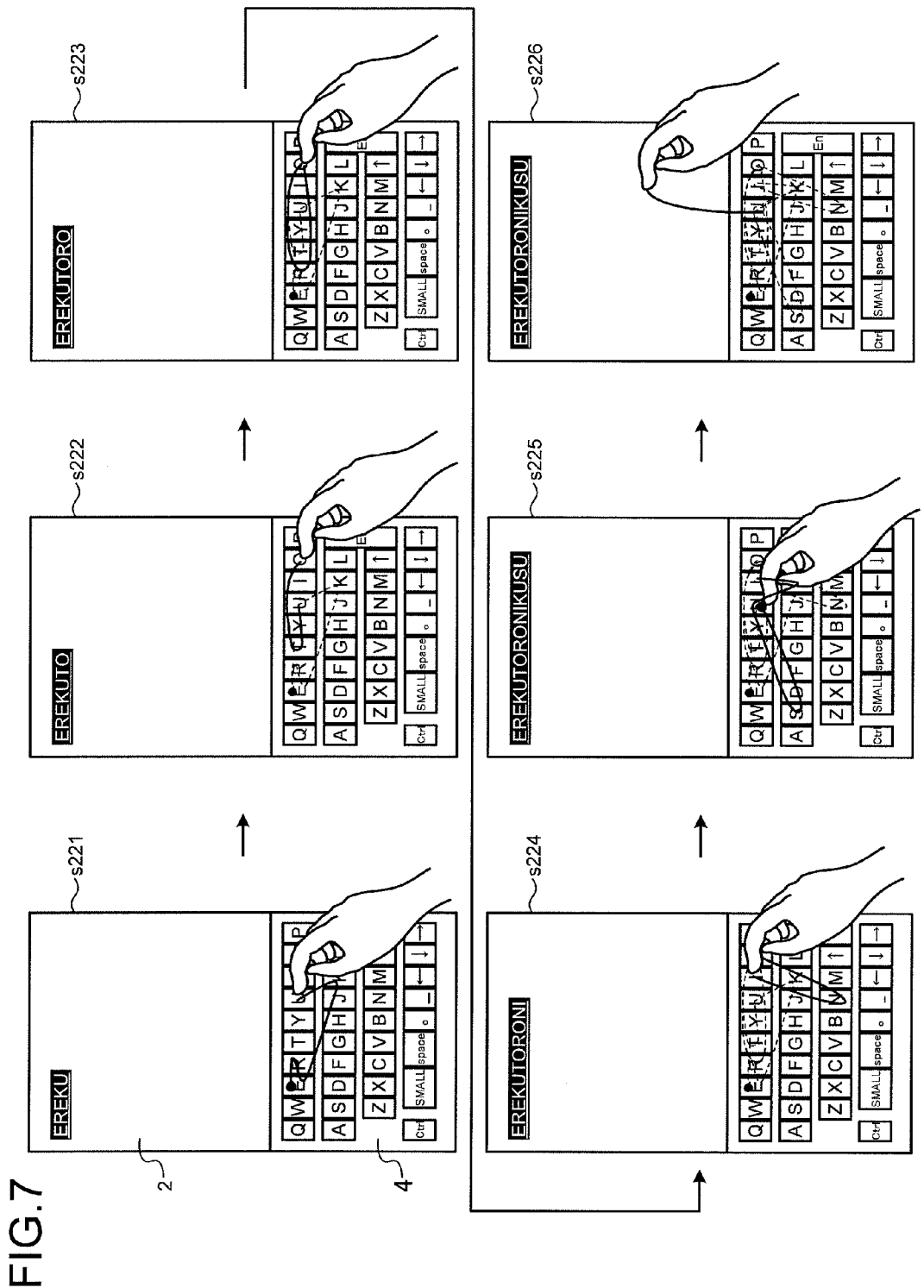
FIG. 7 is a diagram illustrating exemplary operations of input of characters.

An example of an operation is illustrated in FIG. 7 in which the user inputs "electronics (EREKUTORONIKUSU)" to the mobile phone terminal 1. At s221, after the finger is positioned in a button area of "E", the finger passes across buttons in order of "R", "E", "H", "J", and "K" while keeping the touch with the touch panel 2. In this case, the mobile phone terminal 1 determines the button "E" on which the finger is positioned, and the buttons "R", "E", and "K" in which the angular difference between the direction of entering and the direction of leaving is larger than the threshold value to be intentionally touched.

At s222, the finger passes across buttons in order of "U", "Y", "T", "Y", "U", and "I" while keeping the touch with the touch panel 2. In this case, the mobile phone terminal 1 determines the buttons "U" and "T" in which the angular difference between the direction of entering and the direction of leaving is larger than the threshold value to be intentionally touched. At s223, the finger passes across buttons in order of "O", "I", "U", "Y", "T", "R", "T", "Y", "U", and "I" while keeping the touch with the touch panel 2. In this case, the mobile phone terminal 1 determines the buttons "O" and "R" in which the angular difference between the direction of entering and the direction of leaving is larger than the threshold value to be intentionally touched.

At s224, the finger passes across buttons in order of "O", "K", "N", and "J" while keeping the touch with the touch panel 2. In this case, the mobile phone terminal 1 determines the buttons "O" and "N" in which the angular difference between the direction of entering and the direction of leaving is larger than the threshold value to be intentionally touched.

At s225, the finger passes across buttons in order of "I", "K", "U", "G", "F", "D", "S", "R", "T", and "Y" while keeping the touch with the touch panel 2. In this case, the mobile phone terminal 1 determines the buttons "I", "K", "U", and "S" in which the angular difference between the direction of entering and the direction of leaving is larger than the threshold value to be intentionally touched.

At s226, the finger that has moved to the button "U" while keeping the touch with the touch panel 2 moves away from the touch panel 2 in the button area of "U". In this case, the mobile phone terminal 1 determines the button "U" arranged at the position where the finger moves away from the touch panel 2 to be intentionally touched.

With the operations described above, the mobile phone terminal 1 determines that the buttons are intentionally touched in order of "E", "R", "E", "K", "U", "T", "O", "R", "O", "N", "I", "K", "U", "S", and "U". The mobile phone terminal 1 then receives "electronics (EREKUTORONI-KUSU)" obtained by combining the characters corresponding to these buttons in chronological order as an input character string. The character string is identical to a character string intended to be input by the user.

As illustrated in the example of FIG. 7, for each button arranged on the trajectory along which the finger of the user moves while keeping the touch with the touch panel 2, the mobile phone terminal 1 accurately determines whether the finger intentionally touches it, or only passes across it based on the gesture naturally made by the user, thereby receiving input of the characters. Accordingly, the user can input the characters accurately to the mobile phone terminal 1 at high speed.

The mobile phone terminal 1 does not disregard the characters corresponding to the buttons determined to be buttons across which the finger only passes, but uses the characters to improve the input accuracy. Specifically, the mobile phone terminal 1 refers to a dictionary for the character string obtained by combining the characters corresponding to the buttons determined to be intentionally touched by the user in chronological order. If a word corresponding thereto fails to be found, the mobile phone terminal 1 supplies the character string with the characters corresponding to the buttons determined to be buttons across which the finger only passes, and refers to the dictionary again for the character string thus supplied with the characters to find a proper word.

If the user desires to input the word "WET" to the mobile phone terminal 1, the user puts the finger in the button area of "W", moves the finger in the direction toward the button "T" with the finger keeping the touch with the touch panel 2, and pulls the finger away from the touch panel 2 in the button area of "T". In this case, the button "W" on which the finger is positioned and the button "T" from which the finger is pulled away are determined to be intentionally touched. By contrast, the buttons "E" and "R" arranged on the trajectory along which the finger moves are determined to be buttons across which the finger only passes because the angular difference between the direction of entering and the direction of leaving is small.

However, "WT" that is a character string obtained by combining the characters corresponding to the buttons determined to be intentionally touched by the user in chronological order is not present in the dictionary. Therefore, the mobile phone terminal 1 supplies the character string with the characters corresponding to the buttons determined to be buttons across which the finger only passes in chronological order, creates candidates of "WET", "WRT", and "WERT", and refers to the dictionary for each candidate. In this case, because the word "WET" is included in the dictionary, the mobile phone terminal 1 receives "WET" as the input characters. The character string is identical to the character string intended to be input by the user.

If the word "WET" is to be input, the user may draw a rotational trajectory on the button "E" while moving the finger from the button "W" toward the button "T" with the finger keeping the touch with the touch panel 2. Performing such an operation allows the user to indicate explicitly to the mobile phone terminal 1 that the user intentionally touches the button "E", thereby making it possible to improve the identification accuracy of the input character string.

Figure 8:
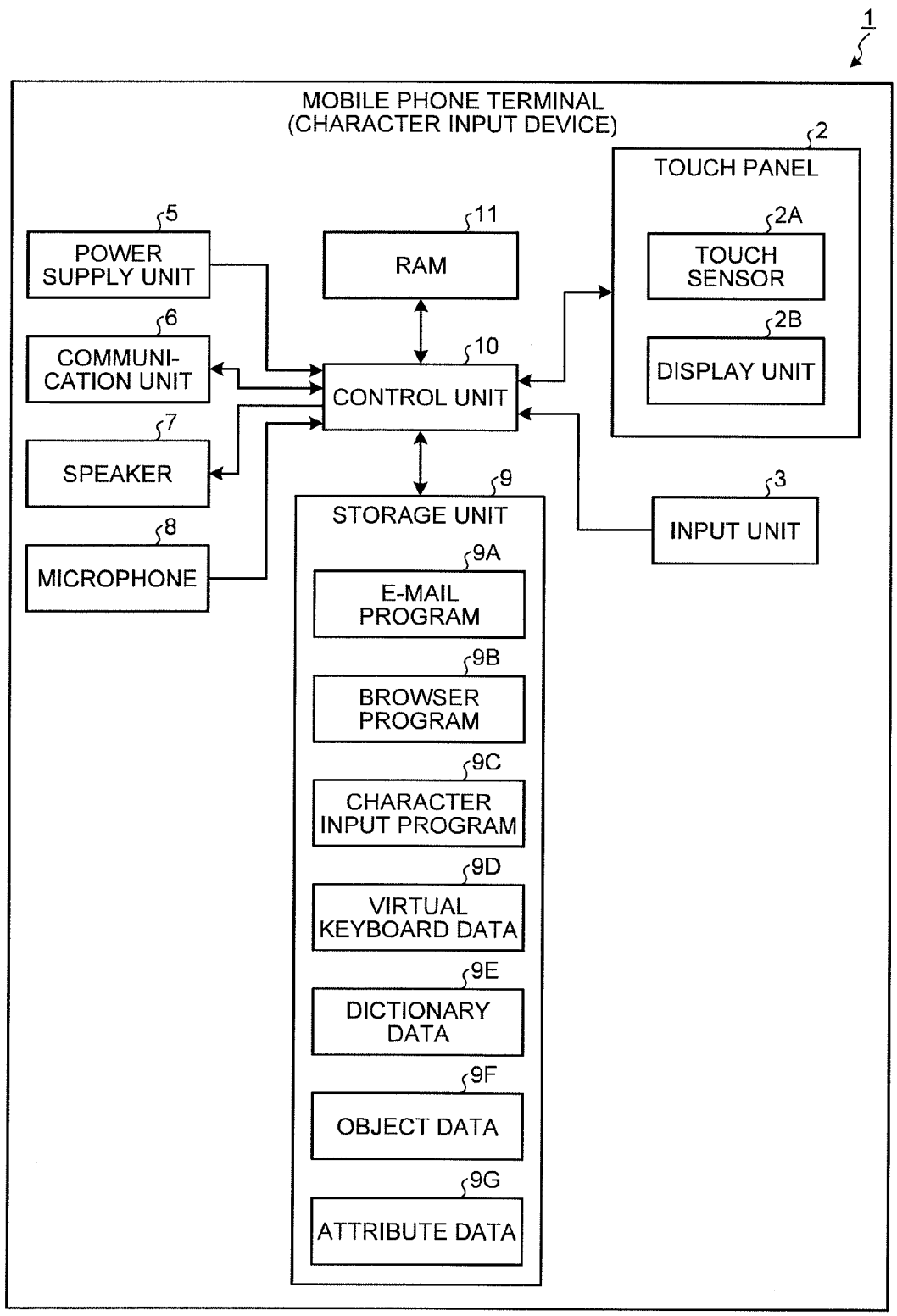
FIG. 8 is a block diagram illustrating a schematic configuration of functions of the mobile phone terminal.

The relationship between a control unit and functions of the mobile phone terminal 1 will now be described. FIG. 8 is a block diagram illustrating a schematic configuration of the functions of the mobile phone terminal 1 illustrated in FIG. 1. As illustrated in FIG. 8, the mobile phone terminal 1 includes the touch panel 2, the input unit 3, a power supply unit 5, a communication unit 6, a speaker 7, a microphone 8, a storage unit 9, a main control unit 10, and a random access memory (RAM) 11.

The touch panel 2 includes a display unit 2B and a touch sensor 2A superimposed on the display unit 2B. The touch sensor 2A detects various types of gestures made with respect to the touch panel 2 using the finger as well as a position in which the gesture is made on the touch panel 2. The gestures detected by the touch sensor 2A include a gesture of bringing the finger into contact with the surface of the touch panel 2, a gesture of moving the finger with the finger keeping the touch with the surface of the touch panel 2, and a gesture of pulling the finger away from the surface of the touch panel 2. The touch panel 2 may adopt any sensing method, such as a pressure-sensitive method, and a capacitance method. The display unit 2B is formed of a liquid crystal display (LCD), an organic electro-luminescence (EL) panel, for example, and displays a character, a figure, an image, and the like.

The input unit 3 receives an operation performed by the user via a physical button or the like, and transmits a signal corresponding to the operation thus received to the main control unit 10. The power supply unit 5 supplies electricity obtained from a battery or an external power supply to each function unit of the mobile phone terminal 1 including the main control unit 10. The communication unit 6 establishes a wireless signal path by a code division multiple access (CDMA) method or the like with a base station via a channel allocated by the base station, and performs telephone communications and information communications with the base station. The speaker 7 outputs a voice on the other side in the telephone communications, a ring tone, and the like. The microphone 8 converts a voice of the user or the like into an electrical signal.

A storage unit 9 is a nonvolatile memory or a magnetic-storage device, for example, and stores therein a computer program and data used for processing in a main control unit 10. Specifically, the storage unit 9 stores therein an e-mail program 9A for transmitting, receiving, and reading an e-mail, a browser program 9B for browsing a Web page, and a character input program 9C for realizing input of characters illustrated in FIG. 2.

Furthermore, the storage unit 9 stores therein virtual keyboard data 9D including the definition related to the virtual keyboard 4 displayed on the touch panel 2 at the time of inputting a character, dictionary data 9E in which proper character strings are registered, object data 9F serving as a main body of the objects, and attribute data 9G in which attribute information of the objects is stored. The object data 9F and the attribute data 9G correspond to each other by a common ID or the like. The attribute information of the objects may not be stored in the attribute data 9G, but be embedded in the object data 9F.

The storage unit 9 also stores therein an operating system program that realizes basic functions of the mobile phone terminal 1, and other computer programs and data, such as address book data in which names, phone numbers, e-mail addresses, and the like are registered.

The main control unit 10 is a central processing unit (CPU), for example, and controls operations of the mobile phone terminal 1 integrally. Specifically, the main control unit 10 executes the computer program stored in the storage unit 9 while referring to the data stored in the storage unit 9 as necessary, and controls the touch panel 2, the communication unit 6, and the like to perform various types of processing. The main control unit 10 loads the computer program stored in the storage unit 9 and data that is acquired, generated, and processed by performing the processing on the RAM 11 providing a temporary storage area as necessary. The computer program executed by the main control unit 10 and the data referred to by the main control unit 10 may be downloaded from a server device through wireless communications performed by the communication unit 6.

FIG. 9 illustrates an example of the virtual keyboard data 9D stored in the storage unit 9. As illustrated in the example of FIG. 9, in the virtual keyboard data 9D, a character corresponding to a button, the position (e.g., the top-left coordinate), the width, the height, and the like of the button are registered for each button included in the virtual keyboard 4. In the example illustrated in FIG. 9, it is registered that a character corresponding to a button is "Q", that the top-left coordinate of the button represents x=10 and Y=10, and that the width and the height of the button are 20 and 40, respectively.

Figure 10:
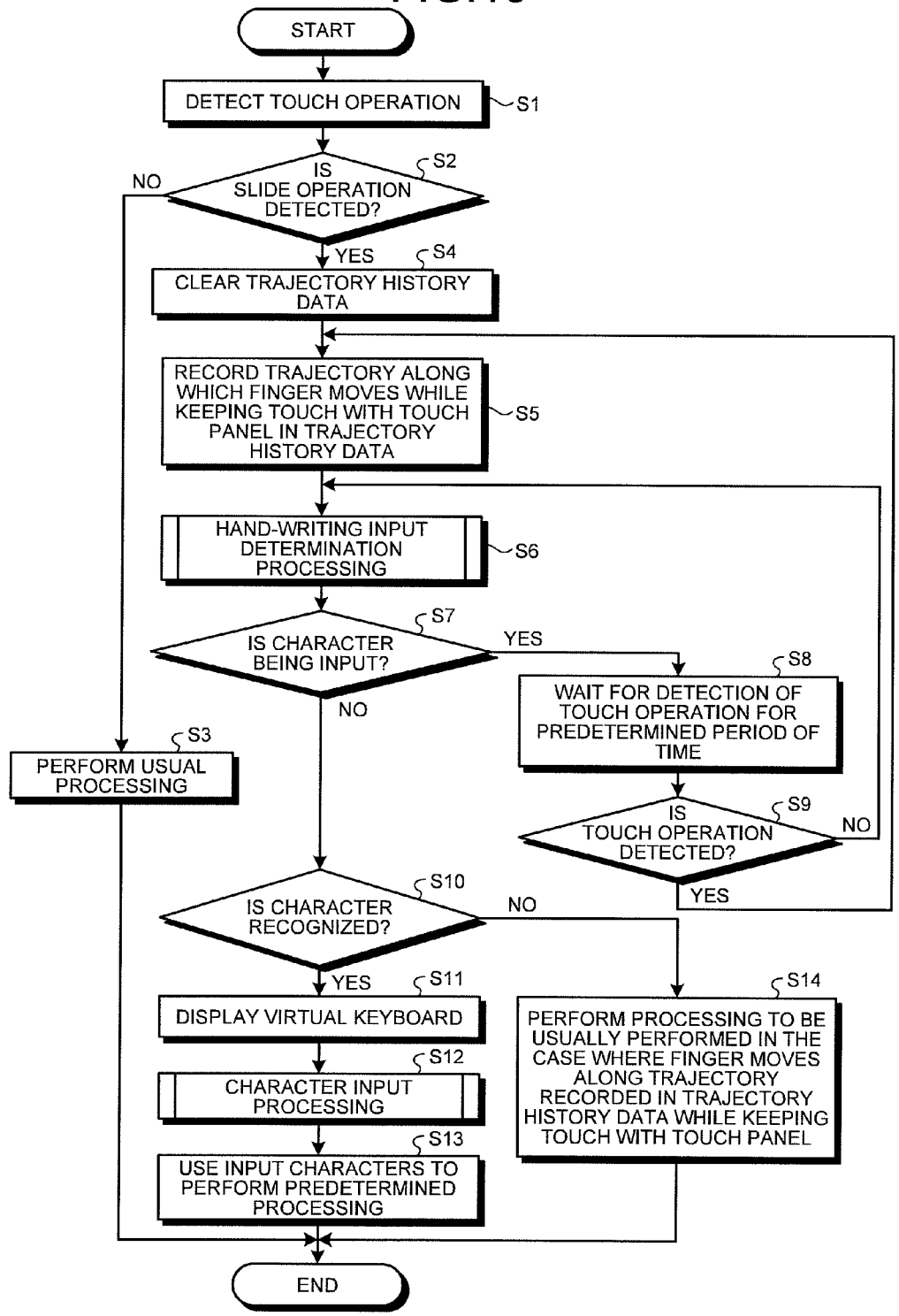
FIG. 10 is a flowchart illustrating a processing process when the mobile phone terminal receives input of characters.

Operations when the mobile phone terminal 1 receives input of characters will now be described. FIG. 10 is a flowchart of a processing process when the mobile phone terminal 1 receives input of characters. Attribute information input processing illustrated in FIG. 10 is realized by the main control unit 10 reading and executing the character input program 9C from the storage unit 9.

If the touch panel 2 detects a touch operation of the finger coming into contact with the touch panel 2 at Step 51, the main control unit 10 of the mobile phone terminal 1 determines whether the touch panel 2 detects a slide operation of the finger moving while keeping the touch with the touch panel 2 subsequently to the touch operation at Step S2. At this time, if no slide operation is detected (NO at Step S2), the main control unit 10 performs usual processing in accordance with the screen displayed on the touch panel 2 at Step S3.

By contrast, if the slide operation is detected (YES at Step S2), the main control unit 10 clears trajectory history data at Step S4. The trajectory history data is data in which a trajectory from when the finger moves while keeping the touch with the touch panel 2 to when the finger is pulled away from the touch panel 2 is recorded, and is retained in a RAM 11 or the storage unit 9. A plurality of trajectories can be recorded in the trajectory history data. Each trajectory may be configured to be a set of coordinates of positions at which contact of the finger is detected, or to be a set of vectors indicating the positions at which contact of the finger is detected and movement directions of the finger.

Subsequently, at Step S5, the main control unit 10 traces the movement of the finger until the finger is pulled away from the touch panel 2. If the touch panel 2 detects that the finger is pulled away from the touch panel 2, the main control unit 10 additionally records the trajectory along which the finger moves while keeping the touch with the touch panel 2 in the trajectory history data. The main control unit 10 then performs hand-writing input determination processing, which will be described later, at Step S6. In the hand-writing input determination processing, it is determined whether a character is being input by the hand-writing method based on the trajectory history data. If it is determined that the input of the character is completed, recognition of the character is performed by the character recognition processing.

If it is determined, by the hand-writing input determination processing, that the character is being input by the hand-writing method (YES at Step S7), the main control unit 10 waits for detection of a touch operation by the touch panel 2 for a predetermined period of time at Step S8. The predetermined period of time is preferably an extremely short period of time. If a touch operation is detected (YES at Step S9), the main control unit 10 returns to Step S5, and traces the movement of the finger and records the trajectory. If no touch operation is detected (NO at Step S9), the main control unit 10 returns to Step S6, and performs the hand-writing input determination processing.

If it is determined that the input of the character by the hand-writing method is completed by the hand-writing input determination processing (NO at Step S7), the main control unit 10 confirms whether the character is recognized by the hand-writing input determination processing at Step S10. If the character is recognized (YES at Step S10), the main control unit 10 displays the virtual keyboard 4 on the touch panel 2 at Step S11.

Subsequently, at Step S12, the main control unit 10 performs character input processing, which will be described later, and receives input of character(s) from the virtual keyboard 4. The main control unit 10 then uses the characters thus input to perform predetermined processing at Step S13. The characters used at Step S13 are characters obtained by combining the character recognized by the hand-writing input determination processing and the character(s) received from the virtual keyboard 4.

By contrast, If no character is recognized by the hand-writing input determination processing (NO at Step S10), the main control unit 10 performs processing to be usually performed in the case where the finger moves along the trajectory recorded in the trajectory history data while keeping the touch with the touch panel 2 at Step S14.

Figure 11:
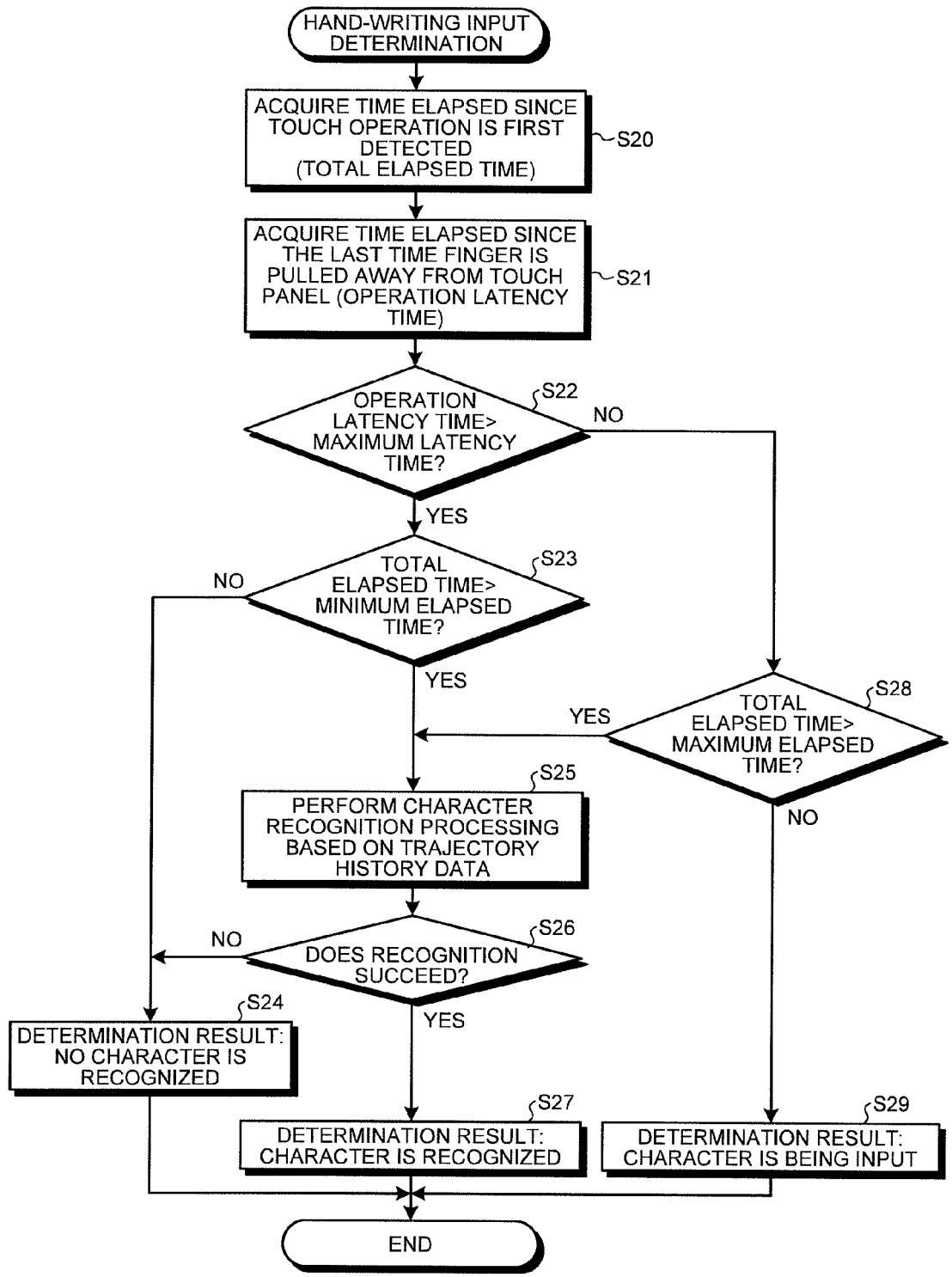
FIG. 11 is a flowchart illustrating a processing process of hand-writing input determination processing.

The hand-writing input determination processing performed at Step S6 in FIG. 10 will now be described with reference to the flowchart illustrated in FIG. 11.

The main control unit 10 acquires total elapsed time that is time elapsed since a touch operation is first detected (elapsed time since Step 51 in FIG. 10) at Step S20. Furthermore, at Step S21, the main control unit 10 acquires operation latency time that is time elapsed since the last time the finger is pulled away from the touch panel 2.

The main control unit 10 then compares the operation latency time with the maximum latency time at Step S22. As described above, the maximum latency time is enough time from when input of a stroke by the hand-writing method is completed to when input of the next stroke is started. Note that the maximum latency time may be set fixedly in advance, or can be changed by the user.

If the operation latency time is longer than the maximum latency time, it is assumed that the user completes inputting a character by the hand-writing method. Therefore, if the operation latency time is longer than the maximum latency time (YES at Step S22), the main control unit 10 compares the total elapsed time with the minimum elapsed time at Step S23. The minimum elapsed time is time at least required to input a character by the hand-writing method. Note that the minimum elapsed time may be set fixedly in advance, or can be changed by the user.

If the total elapsed time is shorter than the minimum elapsed time (NO at Step S23), the main control unit 10 determines that no character is recognized as a determination result at Step S24, and terminates the hand-writing input determination processing. As described above, if it is obvious that no character is input judging from the total elapsed time, the main control unit 10 determines that no character is recognized without performing the character recognition processing that is processing with a relatively heavy load.

By contrast, if the total elapsed time is longer than the minimum elapsed time (YES at Step S23), the main control unit 10 performs the character recognition processing based on the trajectory history data at Step S25. If a character is recognized by the character recognition processing (YES at Step S26), the main control unit 10 determines that the character is recognized as a determination result at Step S27, and terminates the hand-writing input determination processing. Furthermore, if no character is recognized by the character recognition processing (NO at Step S26), the main control unit 10 determines that no character is recognized as a determination result at Step S24, and terminates the hand-writing input determination processing.

If the operation latency time is shorter than the maximum latency time at Step S22 (NO at Step S22), the main control unit 10 compares the total elapsed time with the maximum elapsed time at Step S28. As described above, the maximum elapsed time is enough time to input a character by the hand-writing method. Note that the maximum elapsed time may be set fixedly in advance, or can be changed by the user.

If the total elapsed time is longer than the maximum elapsed time, it is assumed that the user completes inputting the character by the hand-writing method. Therefore, if the total elapsed time is longer than the maximum elapsed time (YES at Step S28), the main control unit 10 performs the character recognition processing and processing in association therewith subsequent to Step S25 that have been already explained.

By contrast, if the total elapsed time is shorter than the maximum elapsed time, there is a possibility that the user has not completed inputting the character by the hand-writing method yet. Therefore, if the total elapsed time is shorter than the maximum elapsed time (NO at Step S28), the main control unit 10 determines that the character is being input as a determination result at Step S29, and terminates the hand-writing input determination processing.

Figure 12:
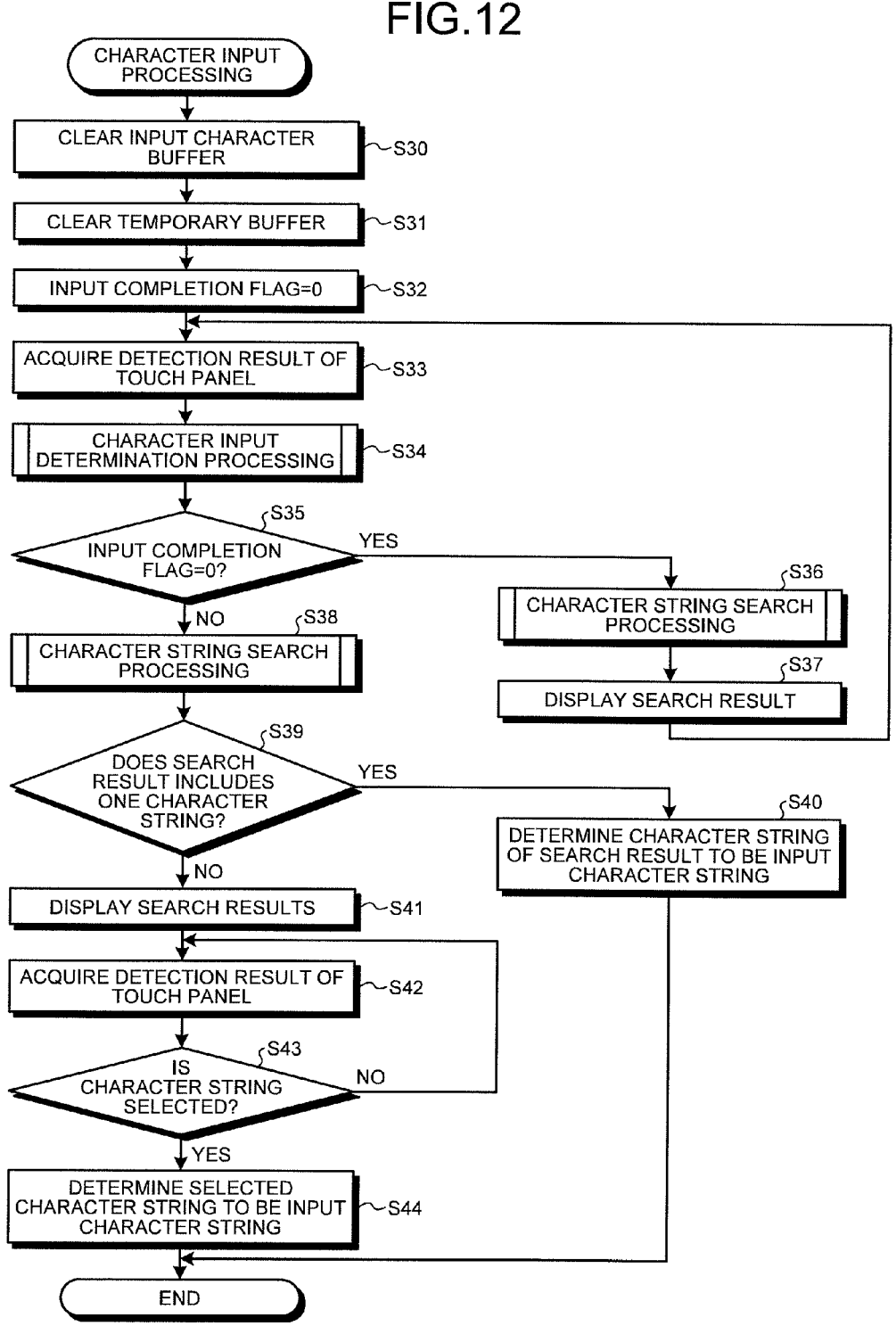
FIG. 12 is a flowchart illustrating a processing process of character input processing.

The character input processing performed at Step S12 in FIG. 10 will now be described with reference to the flowchart illustrated in FIG. 12. The character input processing in the description below uses the fact that the user pulls the finger away from the touch panel 2 as a termination condition of input of a character, and is suitable for inputting a relatively short character string by the consecutive method. If it is accepted that characters are input by tapping buttons in the virtual keyboard 4 one by one, or if it is required to input a relatively long character string, the character input processing in the description below is performed repeatedly. In this case, for example, a tap on the completion button illustrated in FIG. 2 is preferably used as the termination condition of input of a character.

The main control unit 10 clears an input character buffer 12 at Step S30, and clears a temporary buffer 13 at Step S31. The input character buffer 12 is a storage area where characters corresponding to buttons on the trajectory along which the finger moves while keeping the touch with the touch panel 2 are stored in a manner corresponding to priority, and is included in the RAM 11. The temporary buffer 13 is a storage area characters corresponding to buttons determined to be buttons across which the finger only passes among the buttons on the trajectory along which the finger moves while keeping the touch with the touch panel 2 are temporarily stored, and is included in the RAM 11.

Figure 13:
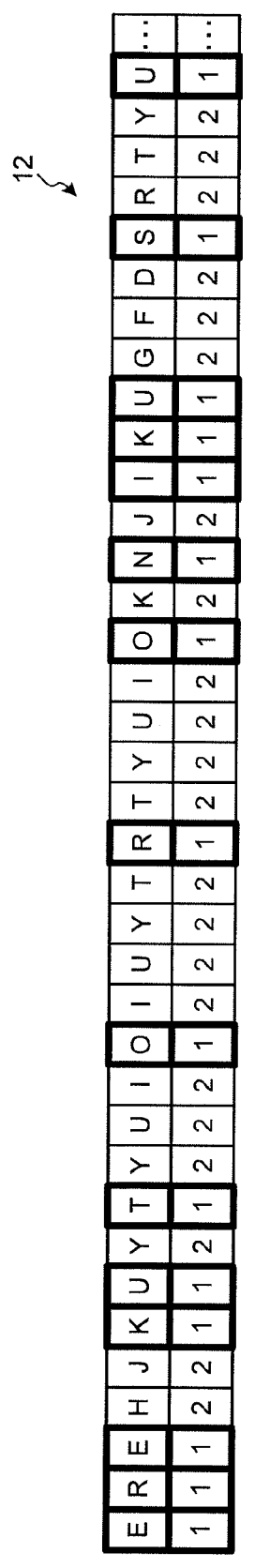

An example of the input character buffer 12 is illustrated in FIG. 13. FIG. 13 illustrates the input character buffer 12 when the operation illustrated in FIG. 7 is performed on the touch panel 2. In the example illustrated in FIG. 13, the characters corresponding to the buttons on the trajectory along which the finger moves while keeping the touch with the touch panel 2 are stored in the upper row of the input character buffer 12, and the priority corresponding to each of the characters in the upper row is stored in the lower row. As illustrated in the example of FIG. 13, the input character buffer 12 stores therein the characters corresponding to the buttons on the trajectory along which the finger moves while keeping the touch with the touch panel 2 in chronological order.

The priority is used for determining whether the character corresponding thereto is employed when a character string is created by combining the characters included in the input character buffer 12. In the present embodiment, as the value of the priority is small, the character corresponding thereto is employed preferentially. Specifically, "1" is assigned as priority to a character corresponding to a button determined to be intentionally touched by the finger, and "2" is assigned as priority to a character corresponding to a button determined to be a button across which the finger only passes.

Figure 14:
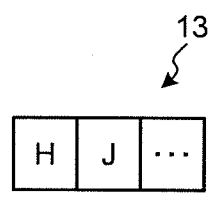
FIG. 14 is a diagram illustrating an example of a temporary buffer.

An example of the temporary buffer 13 is illustrated in FIG. 14. FIG. 14 illustrates the temporary buffer 13 at the point when the finger leaves the button "J" at s221 in FIG. 7. As illustrated in the example of FIG. 14, the temporary buffer 13 stores therein the characters corresponding to the buttons determined to be buttons across which the finger only passes in chronological order until any button is determined to be intentionally touched by the finger.

After clearing the input character buffer 12 and the temporary buffer 13, the main control unit 10 sets an input completion flag included in the RAM 11 to 0 at Step S32. The input completion flag is used for determining whether input of characters at a time is completed. The input of characters at a time herein means input of characters performed from when the user causes the finger to touch with the touch panel 2 to when the user pulls the finger away therefrom.

Subsequently, the main control unit 10 acquires the latest detection result of the touch panel 2 at Step S33, and performs the character input determination processing at Step S34. In the character input determination processing, the main control unit 10 stores characters corresponding to buttons displayed on the trajectory along which the finger moves while keeping the touch with the touch panel 2 in the input character buffer 12 and the temporary buffer 13. Details of the character input determination processing will be described later.

After performing the character input determination processing, the main control unit 10 determines whether an input completion flag remains to be 0 at Step S35. At this time, if the input completion flag remains to be 0, that is, if the input of characters at a time is not completed yet (YES at Step S35), the main control unit 10 performs character string search processing at Step S36 to search the dictionary data 9E for a character string that matches a character string obtained by combining the character recognized by the hand-writing input determination processing and the characters stored in the input character buffer 12. Details of the character string search processing will be described later.

Figure 15:
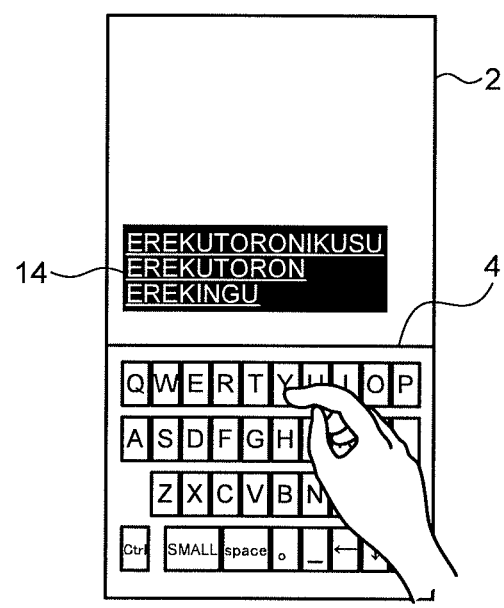
FIG. 15 is a diagram illustrating an input character string candidate display area displayed on a touch panel.

Subsequently, at Step S37, the main control unit 10 displays one or more character strings acquired by the character string search processing in an input character string candidate display area 14 as illustrated in FIG. 15. The main control unit 10 then performs the processing of Step S33 to Step S37 repeatedly until it is determined that the input completion flag is not 0, that is, it is determined that the input of characters at a time is completed at Step S35.

If the input completion flag is not 0 at Step S35 (NO at Step S35), the main control unit 10 performs the character string search processing at Step S38 to search the dictionary data 9E for a character string that matches a character string obtained by combining the character recognized by the hand-writing input determination processing and the characters stored in the input character buffer 12. At this time, if one character string alone is acquired as a processing result of the character string search processing (YES at Step S39), the main control unit 10 receives, as an input character string, the character string acquired as the processing result of the character string search processing at Step S40.

By contrast, if a plurality of character strings are acquired as processing results of the character string search processing (NO at Step S39), the main control unit 10 displays the character strings acquired as the processing results of the character string search processing in the input character string candidate display area 14 as illustrated in FIG. 15 at Step S41. Subsequently, the main control unit 10 acquires the latest detection result of the touch panel 2 at Step S42, and determines whether any of the character strings displayed in the input character string candidate display area 14 is selected at Step S43.

At this time, if none of the character strings is selected (NO at Step S43), the main control unit 10 performs the processing of Step S42 to Step S43 repeatedly until any of the character strings is selected. At Step S42, if a gesture indicating cancel of input, such as a gesture of the finger of the user keeping the touch with an area other than the input character string candidate display area 14, is detected, the main control unit 10 may terminate the character input processing.

If any of the character strings displayed in the input character string candidate display area 14 is selected (YES at Step S43), the main control unit 10 receives the character string thus selected as an input character string at Step S44.

Figure 16A:
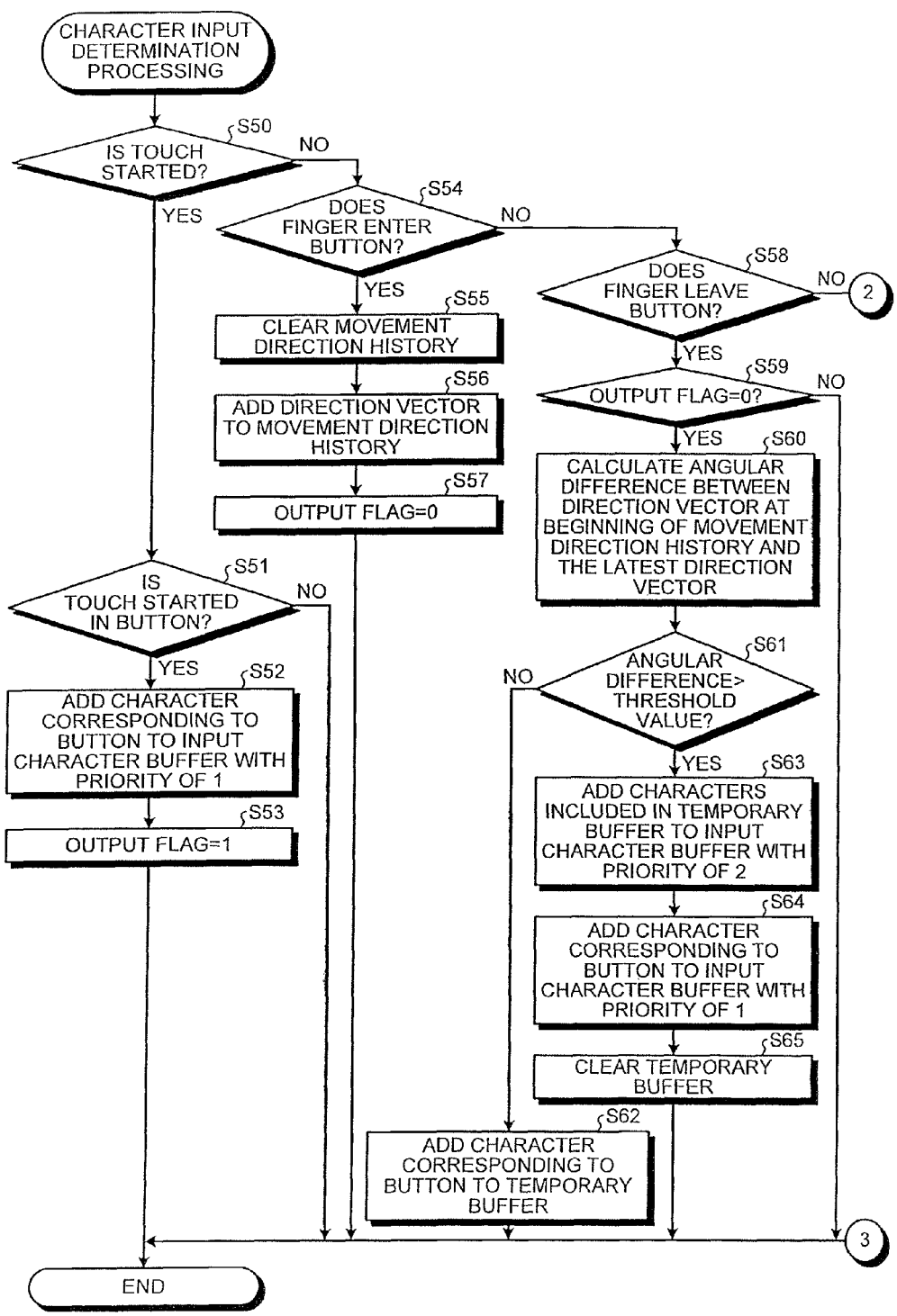
FIG. 16A is a flowchart illustrating a processing process of character input determination processing.
Figure 16B:
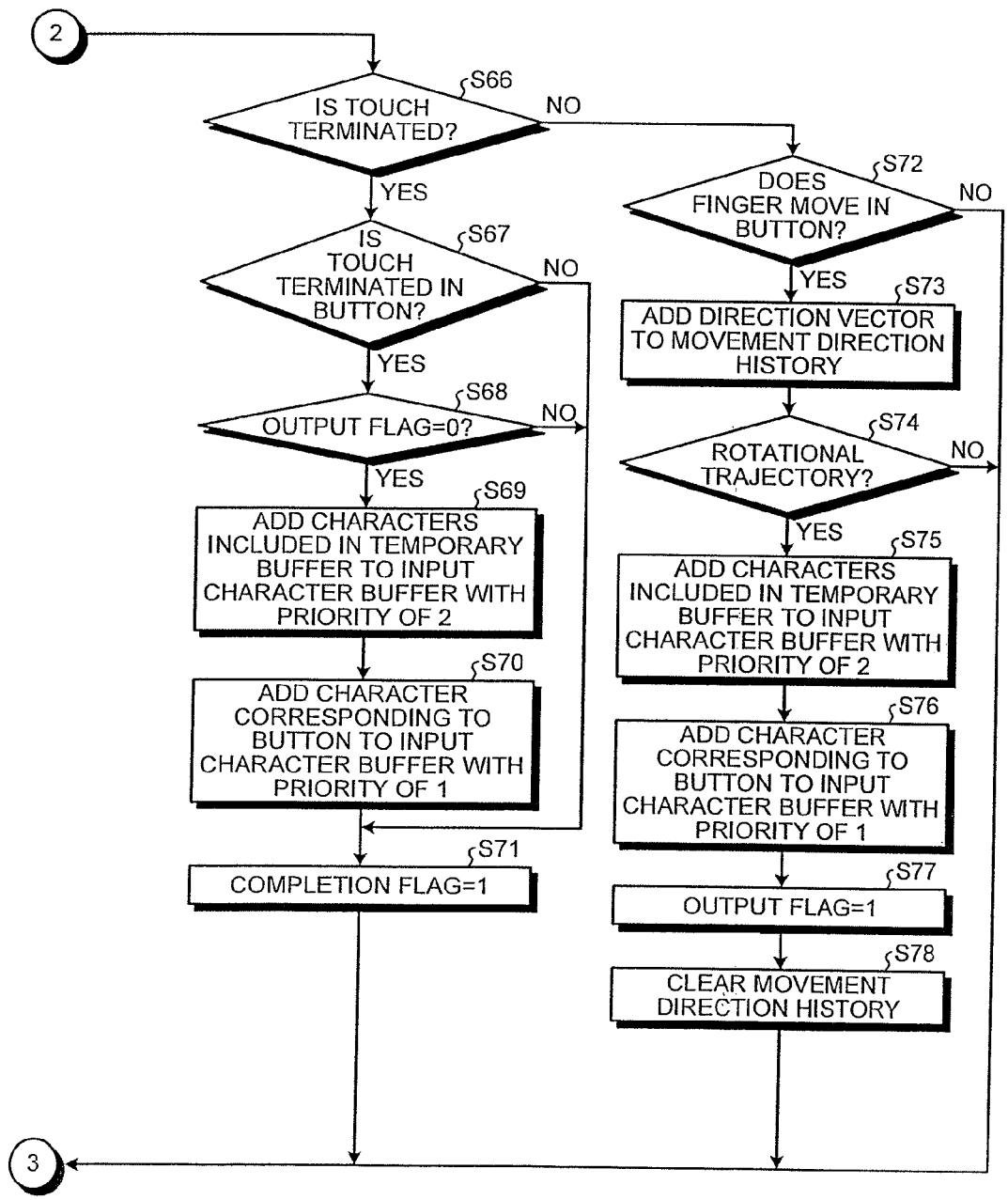
FIG. 16B is a flowchart illustrating a processing process of character input determination processing.

The character input determination processing performed at Step S34 in FIG. 12 will now be described with reference to a flowchart illustrated in FIGS. 16A and 16B. At Step S50, the main control unit 10 determines whether the gesture detected on the touch panel 2 is a gesture of starting touch with the touch panel 2, that is, a gesture of bringing the finger into contact with the surface of the touch panel 2 based on the detection result of the touch panel 2.

If the gesture thus detected is the gesture of starting touch with the touch panel 2 (YES at Step S50), the main control unit 10 compares the position where the touch is started with the virtual keyboard data 9D, and determines whether the position where the touch is started is in any one of the button areas at Step S51. If the position where the touch is started is in any one of the button areas (YES at Step S51), the button is assumed to be intentionally touched. Therefore, the main control unit 10 adds a character corresponding to the button to the input character buffer 12 in a manner corresponding to priority "1" at Step S52. The character corresponding to the button is acquired from the virtual keyboard data 9D.

Subsequently, the main control unit 10 sets an output flag to "1" at Step S53, and terminates the character input determination processing. The output flag is included in the RAM 11, and used for determining whether the character corresponding to the button displayed at the position with which the finger is touching has already been output to the input character buffer 12 or the temporary buffer 13. If the value of the output flag is "0", the character corresponding to the button displayed at the position with which the finger is touching is yet to be output to neither of the buffers. If the value of the output flag is "1", the character corresponding to the button displayed at the position with which the finger is touching has already been output to either of the buffers.

At Step S51, if the position where the touch is started is not in a button area (NO at Step S51), the main control unit 10 terminates the character input determination processing without performing any processing in particular.

At Step S50, if the gesture detected on the touch panel 2 is not the gesture of starting touch with the touch panel 2 (NO at Step S50), the main control unit 10 determines whether the gesture detected on the touch panel 2 is a gesture of moving the finger into a button area with the finger keeping the touch with the touch panel 2 based on the detection result of the touch panel 2 at Step S54. Whether the gesture thus detected is the gesture of moving the finger into the button area with the finger keeping the touch with the touch panel 2 is determined by comparing the position of touch indicated by the latest detection result of the touch panel 2 and the position of touch indicated by the detection result prior thereto with the virtual keyboard data 9D.

If the gesture thus detected is the gesture of moving the finger into the button area with the finger keeping the touch with the touch panel 2 (YES at Step S54), the main control unit 10 clears a movement direction history at Step S55. The movement direction history is data in which a direction vector indicating which direction the finger moves in a button area is recorded in chronological order, and is stored in the RAM 11.

Subsequently, at Step S56, the main control unit 10 acquires a direction vector indicating the direction in which the finger enters the button area, and adds the direction vector thus acquired to the movement direction history. The main control unit 10 then sets the output flag to "0" at Step S57, and terminates the character input determination processing.

If the detection result of the touch panel 2 includes information indicating the direction of movement of the finger, the direction vector is acquired from the detection result of the touch panel 2. If the detection result of the touch panel 2 includes no information indicating the direction of movement of the finger, the direction vector is calculated from the position of touch indicated by the latest detection result of the touch panel 2 and the position of touch indicated by the detection result prior thereto.

At Step S54, if the gesture detected on the touch panel 2 is not the gesture of moving the finger into the button area with the finger keeping the touch with the touch panel 2 (NO at Step S54), the main control unit 10 determines whether the gesture detected on the touch panel 2 is a gesture of moving the finger out of a button with the finger keeping the touch with the touch panel 2 based on the detection result of the touch panel 2 at Step S58. Whether the gesture thus detected is the gesture of moving the finger out of the button with the finger keeping the touch with the touch panel 2 is determined by comparing the position of touch indicated by the latest detection result of the touch panel 2 and the position of touch indicated by the detection result prior thereto with the virtual keyboard data 9D.

If the gesture thus detected is the gesture of moving the finger out of the button with the finger keeping the touch with the touch panel 2 (YES at Step S58), the main control unit 10 determines whether the output flag is "0" at Step S59. At this time, if the output flag is not "0", that is, if the character corresponding to the button in which the finger has been positioned is already output to either of the buffers (NO at Step S59), the main control unit 10 terminates the character input determination processing without performing any processing in particular.

By contrast, if the output flag is "0" (YES at Step S59), the main control unit 10 acquires the latest movement vector, that is, a direction vector indicating the direction in which the finger moves out of the button, and calculates the angular difference between the direction vector and a direction vector at the beginning of the movement direction history at Step S60. The angular difference calculated at this time represents the magnitude of difference between the direction in which the finger enters the button and the direction in which the finger leaves the button.

If the angular difference thus calculated is equal to or smaller than the predetermined threshold value (NO at Step S61), the finger is assumed to only pass across the button. Therefore, the main control unit 10 adds the character corresponding to the button to the temporary buffer 13 at Step S62, and terminates the character input determination processing.

By contrast, if the angular difference thus calculated is larger than the predetermined threshold value (YES at Step S61), the button is assumed to be intentionally touched. Therefore, the main control unit 10 performs a processing process subsequent to Step S63 such that the character corresponding to the button is stored in the input character buffer 12 together with characters corresponding to other buttons on the trajectory along which the finger moves in chronological order.

At Step S63, the main control unit 10 adds the character(s) stored in the temporary buffer 13 to the input character buffer 12 in a manner corresponding to priority "2". Subsequently, at Step S64, the main control unit 10 adds the character corresponding to the button to the input character buffer 12 in a manner corresponding to priority "1". The main control unit 10 then clears the temporary buffer 13 at Step S65, and terminates the character input determination processing.

At Step S58, if the gesture detected on the touch panel 2 is not the gesture of moving the finger out of the button with the finger keeping the touch with the touch panel 2 (NO at Step S58), the main control unit 10 determines whether the gesture detected on the touch panel 2 is a gesture of terminating the touch with the touch panel 2, that is, a gesture of pulling the finger away from the touch panel 2 based on the detection result of the touch panel 2 at Step S66.

If the gesture thus detected is the gesture of terminating the touch with the touch panel 2 (YES at Step S66), the main control unit 10 compares the position where the touch is terminated with the virtual keyboard data 9D, and determines whether the position where the touch is terminated is in any one of the button areas at Step S67. If the position where the touch is terminated is in any one of the button areas (YES at Step S67), the button is assumed to be intentionally touched. Therefore, the main control unit 10 performs a processing process subsequent to Step S68 such that the character corresponding to the button is stored in the input character buffer 12 together with characters corresponding to other buttons on the trajectory along which the finger moves in chronological order.

At Step S68, the main control unit 10 determines whether the output flag is "0". At this time, if the output flag is "0", that is, if the character corresponding to the button assumed to be intentionally touched is yet to be output to neither of the buffers (YES at Step S68), the main control unit 10 adds the character(s) stored in the temporary buffer 13 to the input character buffer 12 in a manner corresponding to priority "2" at Step S69. Subsequently, the main control unit 10 adds the character corresponding to the button to the input character buffer 12 in a manner corresponding to priority "1" at Step S70.

The fact that the gesture of terminating the touch with the touch panel 2 is made indicates that the input of characters at a time is completed. Therefore, the main control unit 10 sets the input completion flag to "1" at Step S71, and terminates the character input determination processing.

If the position where the touch is terminated is not in a button area (NO at Step S67), or if the output flag is not "0" (NO at Step S68), the main control unit 10 performs processing for setting the input completion flag to "1" alone at Step S71, and terminates the character input determination processing.

If the position where the touch is terminated is not in a button area, or if the output flag is not "0", the character stored in the temporary buffer 13 may be added to the input character buffer 12 in a manner corresponding to priority "2".

At Step S66, if the gesture detected on the touch panel 2 is not the gesture of terminating the touch with the touch panel 2 (NO at Step S66), the main control unit 10 determines whether the gesture detected on the touch panel 2 is a gesture of moving the finger in a button area with the finger keeping the touch with the touch panel 2 based on the detection result of the touch panel 2 at Step S72.

If the gesture thus detected is the gesture of moving the finger in the button area with the finger keeping the touch with the touch panel 2 (YES at Step S72), the main control unit 10 acquires a direction vector indicating the direction in which the finger moves in the button area, and adds the direction vector thus acquired to the movement direction history at Step S73. The main control unit 10 then refers to each direction vector recorded in the movement direction history, and determines whether the finger moves to draw a rotational trajectory in the button area while keeping the touch with the touch panel 2 at Step S74.

At this time, if the finger moves to draw a rotational trajectory in the button area while keeping the touch with the touch panel 2 (YES at Step S74), the button is assumed to be intentionally touched. Therefore, the main control unit 10 performs a processing process subsequent to Step S75 such that the character corresponding to the button is stored in the input character buffer 12 together with characters corresponding to other buttons on the trajectory along which the finger moves in chronological order.

At Step S75, the main control unit 10 adds the character(s) stored in the temporary buffer 13 to the input character buffer 12 in a manner corresponding to priority "2". Subsequently, at Step S76, the main control unit 10 adds the character corresponding to the button to the input character buffer 12 in a manner corresponding to priority "1". The main control unit 10 then sets the output flag to "1" at Step S77, clears the movement direction history at Step S78, and terminates the character input determination processing.

At Step S72, if the gesture detected on the touch panel 2 is not the gesture of moving the finger in the button area with the finger keeping the touch with the touch panel 2, that is, if the finger moves outside the button on the virtual keyboard 4 (NO at Step S72), the main control unit 10 terminates the character input determination processing without performing any processing in particular. Likewise, at Step S74, if the finger dose not move to draw a rotational trajectory in the button area while keeping the touch with the touch panel 2 (NO at Step S74), the main control unit 10 terminates the character input determination processing without performing any processing in particular.

If a gesture of the finger moving out of the virtual keyboard 4 while keeping the touch with the touch panel 2 is detected, the same processing process as that in the case where a gesture of terminating the contact with the touch panel 2 is detected may be performed. By contrast, if a gesture of the finger moving into the virtual keyboard 4 while keeping the touch with the touch panel 2 is detected, the same processing process as that in the case where a gesture of starting the contact with the touch panel 2 is detected may be performed. With this configuration, after completing input of characters at a time, the user can shift to the next input promptly while keeping the touch with the touch panel 2 without moving the finger up and down.

Figure 17:
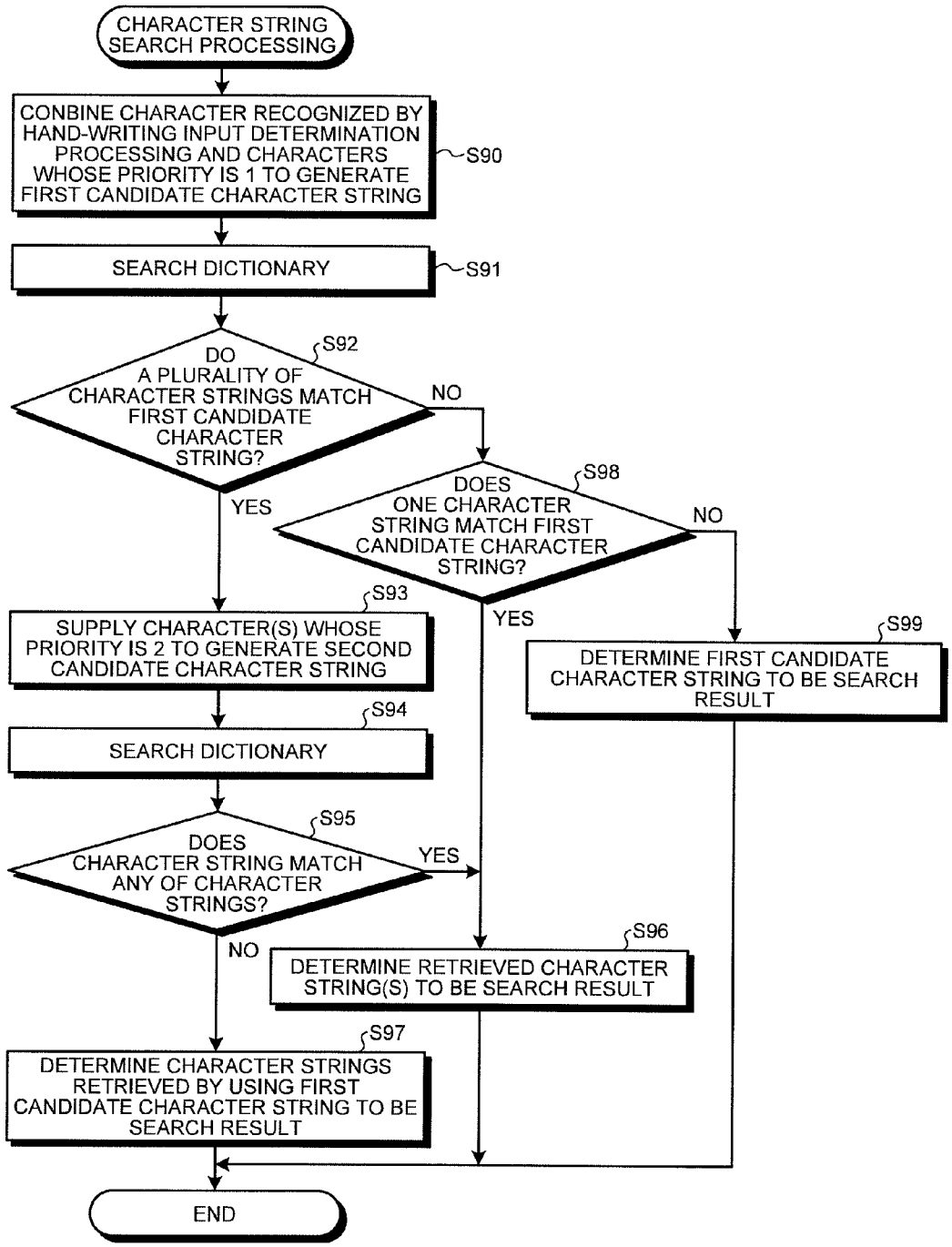
FIG. 17 is a flowchart illustrating a processing process of character string search processing.

The character string search processing performed at Step S36 and Step S38 in FIG. 12 will now be described with reference to the flowchart illustrated in FIG. 17. At Step S90, the main control unit 10 acquires characters whose priority is "1" from the input character buffer 12, and combines the character recognized by the hand-writing input determination processing and the characters whose priority is "1" to generate a first candidate character string.

For example, an assumption is made that a character of "X" is recognized by the hand-writing input determination processing, that four characters of "A", "B", "C", and "D" are stored in the input character buffer 12 in this order chronologically, that the priority of "A" and "D" is "1", and that the priority of "B" and "C" is "2". In this case, the main control unit 10 combines the character recognized by the hand-writing input determination processing and the characters whose priority is "1" in chronological order, and generates a first candidate character string of "XAD".

Subsequently, at Step S91, the main control unit 10 searches the dictionary data 9E for a character string that matches the first candidate character string.

In the present embodiment, if the first candidate character string is "XAD", for example, a character string that matches a pattern of "X*A*D" is retrieved from the dictionary data 9E. The symbol of "*" used herein is a wild card that matches an arbitrary character. In other words, in the present embodiment, a character string whose leading character is identical to that of the first candidate character string, and in which characters subsequent to the leading character of the first candidate character string appear in the same order as that of the first candidate character string with characters of more than zero interposed therebetween is retrieved as a character string that matches the first candidate character string.

By performing the matching in this manner, it is possible to raise the possibility of recognizing the input character string properly even if there is a button incapable of being determined to be intentionally touched by the finger.

If a plurality of character strings are acquired as search results (YES at Step S92), in order to narrow down the search results, the main control unit 10 acquires character(s) whose priority is "2" from the input character buffer 12, and supplies the first candidate character string with the character(s) thus acquired, thereby generating one or more second candidate character strings at Step S93.

Similarly to the description above, for example, an assumption is made that the character of "X" is recognized by the hand-writing input determination processing, that four characters of "A", "B", "C", and "D" are stored in the input character buffer 12 in this order chronologically, that the priority of "A" and "D" is "1", and that the priority of "B" and "C" is "2". In this case, the main control unit 10 supplies "XAD" serving as the first candidate character string with at least one of the characters whose priority is "2" while observing the order of being stored, thereby generating three second candidate character strings of "XABD", "XACD", and "XABCD".

Subsequently, at Step S94, the main control unit 10 searches the dictionary data 9E for a character string that matches any of the second candidate character strings. The matching method is the same as that in the case of the first candidate character string.

At Step S94, if any of the character strings is retrieved (YES at Step S95), the main control unit 10 determines the character string(s) thus retrieved to be the search result at Step S96, and terminates the character string search processing. By contrast, at Step S94, if none of the character strings is retrieved (NO at Step S95), the main control unit 10 determines the character strings that matches the first candidate character string at Step S91 to be the search result at Step S97, and terminates the character string search processing.

At Step S91, if one character string alone is acquired as the search result (NO at Step S92 and YES at Step S98), the main control unit 10 determines the character string thus retrieved to be the search result at Step S96, and terminates the character string search processing. If no character string is acquired as the search result at Step S91 (NO at Step S98), the main control unit 10 determines the first candidate character string, that is, the character string obtained by combining the characters whose priority is "1" in the order of being stored to be the search result at Step S99, and terminates the character string search processing.

As described above, if a character is input by the hand-writing method on the touch panel 2, the mobile phone terminal 1 displays the virtual keyboard 4 on the touch panel 2, and receives the character input by the hand-writing method and a character input by the virtual keyboard method as input. Therefore, the user can start the input of the character promptly by the hand-writing method, and input characters at high speed by the virtual keyboard method without extra operations.

Furthermore, as described above, if a gesture of the finger sliding on the touch panel 2 is detected, the mobile phone terminal 1 defers performing functions specific to the screen being displayed, and receives input of characters. After the input of the characters is completed, the mobile phone terminal 1 displays the processing selection screen 16 to cause the user to select processing, and performs the processing thus selected by using the character string thus received. Therefore, the user can perform input of characters and processing using the characters thus input on an arbitrary screen.

The configuration of the mobile phone terminal 1 can be changed arbitrarily without departing from the spirit and scope of the present invention. In FIG. 2, for example, after the predetermined conditions are satisfied on which input of a character is assumed to be completed, the character recognition processing is performed. Alternatively, after a tap operation is detected at s202, the character recognition processing may be performed successively. When the character input by the hand-writing method is recognized by the character recognition processing, the virtual keyboard 4 may be displayed on the touch panel 2 even if the predetermined conditions are not satisfied.

The example illustrated in FIG. 2 is an example in which the user is caused to select processing to be performed by using the characters thus input. Alternatively, the mobile phone terminal 1 may determine a function corresponding to the characters thus input to activate the function. Specifically, if the characters thus input are a name or an abbreviated name of a specific function, the mobile phone terminal 1 may activate the function. In this case, at the stage of s207 illustrated in FIG. 2, the mobile phone terminal 1 activates a camera function corresponding to "KAMERA" (which means "CAMERA" in English) thus input. If a plurality of numbers corresponding to a phone number are input, the mobile terminal 1 may make a call by using the numbers thus input as the phone number of the other party.

The example illustrated in FIG. 2 is an example in which the characters are input so as to perform processing, such as an Internet search. Alternatively, the character input method illustrated in FIG. 2 may be used for inputting attribute information of an object. The attribute information used herein means character information indicating attributes of the object, and is a file name, a title, a comment, and a name of a creator, for example. If the object is personal data in the address book, the attribute information also includes a name, a phone number, an e-mail address, and the like.

Operations of the mobile phone terminal 1 when receiving input of the attribute information of an object will now be described with reference to an example of FIG. 18.

At s231, the mobile phone terminal 1 displays the object browsing screen used for browsing objects on the touch panel 2. The icons of the objects OB1 to OB10 are displayed on the object browsing screen, and the user puts the finger in the display area of the icon of the object OB1 on the touch panel 2 at s232. The mobile phone terminal 1 reverses the contrast of the icon of the object OB1 to indicate that the icon is being in a selected state.

If the user pulls the finger away from the touch panel 2 in this state, the mobile phone terminal 1 determines that the icon of the object OB1 is tapped, and performs the predetermined processing, such as display, reproduction, and editing, on the object OB1.

By contrast, as illustrated in s233, if the user moves the finger out of the display area of the icon of the object OB1 with the finger keeping the touch with the touch panel 2, the mobile phone terminal 1 defers performing processing on the object OB1 while maintaining the selected state of the icon of the object OB1, and records the trajectory of the movement of the finger. The mobile phone terminal 1 then continues to record the trajectory of the movement of the finger until predetermined conditions are satisfied. As illustrated in s234 and s235, the trajectory detected by the mobile phone terminal 1 during this time includes trajectories obtained by pulling the finger away from the touch panel 2, bringing the finger into contact with another position on the touch panel 2, and moving the finger by the user.

The predetermined conditions on which the mobile phone terminal 1 terminates recording the trajectory of the movement of the finger are conditions on which input of a character is assumed to be completed. The predetermined conditions include a condition that time elapsed since contact of the finger with respect to the touch panel 2 is first detected exceeds the maximum elapsed time and a condition that time elapsed since the last time the finger is pulled away from the touch panel 2 exceeds the maximum latency time, for example.

If the predetermined conditions are satisfied, the mobile phone terminal 1 performs the character recognition processing based on the trajectory thus recorded. If the predetermined conditions are satisfied at the stage of s235, for example, the mobile phone terminal 1 recognizes a character of "KA" in hiragana in Japanese as an input character based on the trajectory thus recorded.

If the recognition of the character succeeds based on the trajectory thus recorded, the mobile phone terminal 1 displays the virtual keyboard 4 on the touch panel 2 as illustrated in s236. Furthermore, the mobile phone terminal 1 displays the input character display screen 15 to which a character string being input is output on the touch panel 2, and outputs "KA" thus recognized to the input character display screen 15 as the first input character.

The mobile phone terminal 1 then receives a character input from the virtual keyboard 4 as a character subsequent to the character recognized by the hand-writing method. At s237, the mobile phone terminal 1 receives input of characters of "ME" and "RA" from the virtual keyboard 4, and adds the characters to "KA" thus recognized in a chronological order, thereby outputting a character string of "KAMERA" to the input character display screen 15 as an input character string.

If the mobile phone terminal 1 detects a gesture indicating completion of the input, such as a gesture of the finger coming into contact with the touch panel 2 in the display area of the completion button in the input character display screen 15, the mobile phone terminal 1 saves the character string thus received as the attribute information of the object OB1 corresponding to the icon in the selected state.

Figure 18:
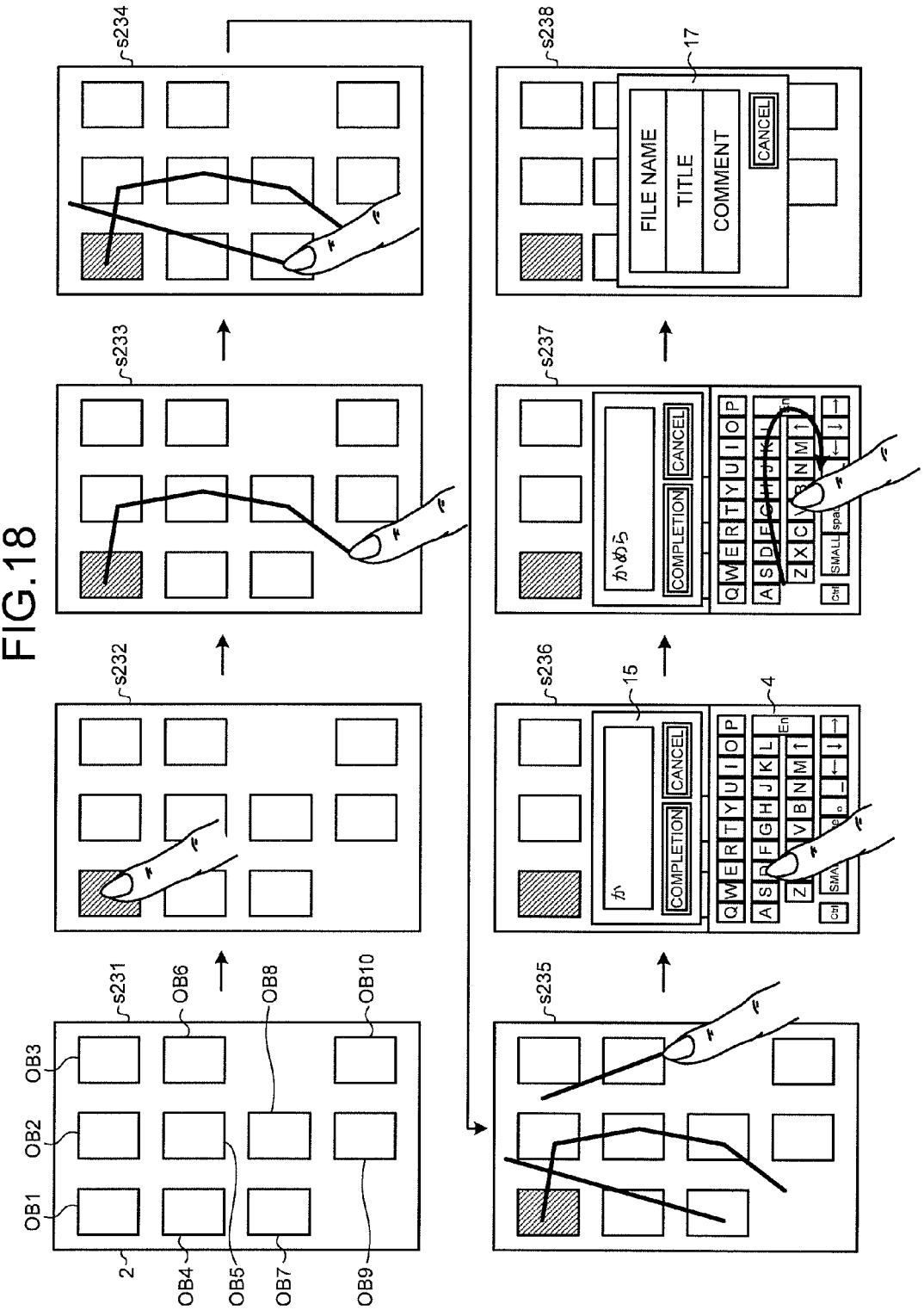
FIG. 18 is a flow diagram illustrating a processing process when attribute information of an object is input.

In the example illustrated in FIG. 18, at s238, the mobile phone terminal 1 displays an attribute selection screen 17 for receiving selection of attribute information as which the character string thus received is to be saved on the touch panel 2. The attribute selection screen 17 includes an option of "file name", an option of "title", and an option of "comment".

If the "file name" is selected, the mobile phone terminal 1 saves the character string thus received as the file name of the object OB1. If the "title" is selected, the mobile phone terminal 1 saves the character string thus received as the title of the object OB1. If the "comment" is selected, the mobile phone terminal 1 saves the character string thus received as the comment of the object OB1.

The example illustrated in FIG. 2 is an example in which, after one character is input by the hand-writing method, the input of characters by the virtual keyboard method is started. Alternatively, a plurality of characters may be input by the hand-writing method. Operations of the mobile phone terminal 1 when receiving input of a plurality of characters by the hand-writing method will now be described with reference to the example of FIG. 19.

At s241, the mobile phone terminal 1 displays the object browsing screen used for browsing objects on the touch panel 2. The icons of the objects OB1 to OB10 are displayed on the object browsing screen, and the user puts the finger in the display area of the icon of the object OB1 on the touch panel 2 at s242. The mobile phone terminal 1 reverses the contrast of the icon of the object OB1 to indicate that the icon is being in a selected state.

If the user pulls the finger away from the touch panel 2 in this state, the mobile phone terminal 1 determines that the icon of the object OB1 is tapped, and performs the predetermined processing, such as display, reproduction, and editing, on the object OB1.

By contrast, as illustrated in s243, if the user moves the finger out of the display area of the icon of the object OB1 with the finger keeping the touch with the touch panel 2, the mobile phone terminal 1 defers performing processing on the object OB1 while maintaining the selected state of the icon of the object OB1, and records the trajectory of the movement of the finger. Furthermore, the mobile phone terminal 1 displays an input character display screen 18 to which a character string being input in output on the touch panel 2.

If the finger enters the display area of the input character display screen 18 while keeping the touch with the touch panel 2, the mobile phone terminal 1 performs the character recognition processing to recognize a character corresponding to the trajectory that has been recorded. If the finger moves to draw a trajectory corresponding to the form of "KO" in hiragana in Japanese while keeping the touch with the touch panel 2 as illustrated in s244, and the finger enters the display area of the input character display screen 18 as illustrated in s245, the mobile phone terminal 1 recognizes a character of "KO" by the character recognition processing, and outputs the character to the input character display screen 18.

If the finger enters a display area of a "completion" button in the input character display screen 18 at this stage, the mobile phone terminal 1 completes receiving the input of the character. If the finger enters a display area of a "KB" button, the mobile phone terminal 1 displays the virtual keyboard 4, and shifts to a state of receiving input of characters by the virtual keyboard method. If the finger leaves the display area of the input character display screen 18 without entering both of the display areas of the "completion" button and the "KB" button, the mobile phone terminal 1 clears the trajectory that has been recorded, and resumes input of a character by the hand-writing method.

At s246, the finger leaves the display area of the input character display screen 18 without entering both of the display areas of the "completion" button and the "KB" button, moves to draw a trajectory corresponding to the form of "I" in hiragana in Japanese, and returns to the display area of the input character display screen 18. In this case, the mobile phone terminal 1 recognizes a character of "I" by the character recognition processing, and additionally outputs the character to the input character display screen 18.

At s247, the finger leaves the display area of the input character display screen 18 without entering both of the display areas of the "completion" button and the "KB" button, and moves to draw a trajectory corresponding to the form of "NU" in hiragana in Japanese. The finger then returns to the display area of the input character display screen 18, and enters the display area of the "completion" button.

In this case, the mobile phone terminal 1 recognizes a character of "NU" by the character recognition processing at the stage where the finger returns to the display area of the input character display screen 18, and additionally outputs the character to the input character display screen 18. The mobile phone terminal 1 then completes receiving the input of the characters at the stage where the finger enters the display area of the "completion" button. The mobile phone terminal 1 then displays the attribute selection screen 17 as illustrated in s248, and causes the user to select attribute information as which "KOINU" (which means "PUPPY" in English) serving as the characters thus received is to be saved. Subsequently, the mobile phone terminal 1 saves "KOINU" serving as the characters thus received as the attribute information of the object OB1 corresponding to the icon in the selected state.

Enabling input of a plurality of characters by the hand-writing method in this manner allows the user to determine to convert from the hand-writing method to the virtual keyboard method by the user's own decision. The conversion is such that input of simple characters capable of being easily input even by the hand-writing method is continued by the hand-writing method, and if a complicated character needs to be input, only by moving the finger onto the "KB" button, the user converts to the virtual keyboard method.

Figure 19:
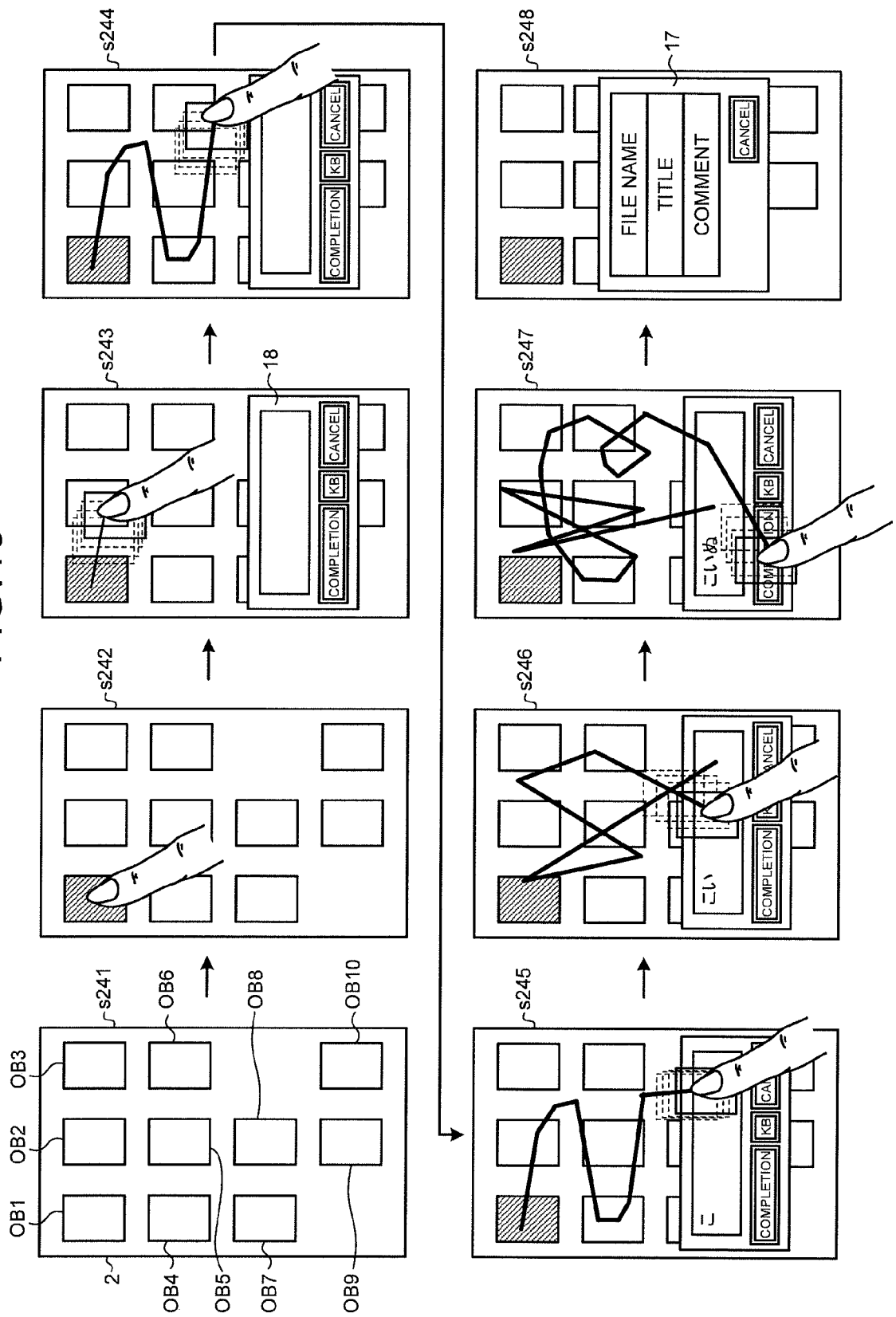
FIG. 19 is a flow diagram illustrating a processing process when a plurality of characters are input by a hand-writing method.

In the example illustrated in FIG. 19, input of a character by the hand-writing method is performed with a single stroke. Alternatively, each stroke in the character may be input one by one as illustrated in the example of FIG. 2. In the example illustrated in FIG. 19, input of the characters is received so as to input the attribute information. However, as illustrated in the example of FIG. 2, also in the case where input of characters used for predetermined processing is received, input of a plurality of characters may be received by the hand-writing method. In the example illustrated in FIG. 19, the fact that the finger enters the display area of the input character display screen 18 is used as the condition to determine that input of a character is completed. Alternatively, as illustrated in the example of FIG. 2, whether input of a character is completed may be determined by using the maximum latency time and/or the maximum elapsed time.

In the example illustrated in FIG. 2, the position at which the virtual keyboard 4 is displayed is not specified. Alternatively, depending on the position of the finger when input of a character by the hand-writing method is completed, the position at which the virtual keyboard 4 is displayed may be adjusted. Operations of the mobile phone terminal 1 when adjusting the display position of the virtual keyboard 4 will now be described with reference to the example of FIG. 20.

An assumption is made that, when the finger is at a position P at s251, the mobile phone terminal 1 determines that input of a character by the hand-writing method is completed, and that "KA" thus input in hiragana in Japanese is recognized by the character recognition processing. In this case, as illustrated in s252, the mobile phone terminal 1 adjusts the display position of the virtual keyboard 4 such that the position P, which is the position where the last contact is detected, is included in the display area of the virtual keyboard 4.

At this time, the array of buttons in the virtual keyboard 4 may be changed such that the position P is included in a display area of a button corresponding to "KA" recognized by the character recognition processing. At s253 in FIG. 20, the mobile phone terminal 1 rotates the buttons of the virtual keyboard 4 in the Japanese syllabary order in column units, thereby causing the position P to be included in the display area of the button corresponding to "KA".

Subsequently, at s254, the user starts inputting characters by the consecutive method using the virtual keyboard 4. As described above, the position at which the virtual keyboard 4 is displayed is adjusted depending on the position of the finger when the input of the character by the hand-writing method is completed (position at which the last contact of the finger is detected). As a result, the user can start input of characters by the virtual keyboard method promptly. Note that the virtual keyboard 4 displayed in this example is a keyboard in the Japanese syllabary order. In the case where an alphanumeric character is input by the hand-writing method, when "K" is recognized by the character recognition processing, for example, the mobile phone terminal 1 may adjust the display position of the virtual keyboard 4 in the QWERTY order such that the position P is included in a display area of a button corresponding to "K". Furthermore, the mobile phone terminal 1 may rotate the buttons of the virtual keyboard 4 in the QWERTY order, thereby causing the position P to be included in the display area of the button corresponding to "K".

In the embodiment, when characters are input by the consecutive method, "1" or "2" is assigned as priority to each character corresponding to each button on the trajectory along which the finger moves without being pulled away from the touch panel 2. However, the priority assigned to the characters may be further fractionized.

For example, "1" may be assigned as priority to a character corresponding to a button determined to be intentionally touched, and any one of "2" to "5" may be assigned as priority to a character corresponding to a button determined to be a button across which the finger only passes.

In this case, for example, for the character corresponding to the button determined to be a button across which the finger only passes, higher priority may be assigned to the character as the angular difference between the movement direction in which the finger enters the button and the movement direction in which the finger leaves the button is larger. This is because the larger the angular difference is, the more likely it is that the button is intentionally touched.

Furthermore, for the character corresponding to the button determined to be a button across which the finger only passes, higher priority may be assigned to the character as the trajectory along which the finger moves is positioned closer to the center of the button. This is because the closer to the center of the button the trajectory along which the finger moves is, the more likely it is that the button is intentionally touched.

If the priority is fractionized in this manner, the character having higher priority is used preferentially when the second candidate character string is created in the character string search processing. Specifically, if a plurality of character strings match the first candidate character string obtained by combining the characters whose priority is "1", the first candidate character string is supplied with the character whose priority is "2" so as to narrow down the search result. If a plurality of character strings still match the first candidate character string to which the character whose priority is "2" is supplied, the first candidate character string is further supplied with the character whose priority is "3" so as to narrow down the search result.

In the same manner hereinafter, the characters are used for the supplement in order of having higher priority until the search result is narrowed down to one character string. Fractionizing the priority in this manner makes it possible to generate a character string to be verified by combining the characters in order of being likely to be intentionally touched. Accordingly, the identification accuracy of the input character string can be improved.

In the character input processing explained with reference to FIG. 12, every time the main control unit 10 acquires a new detection result from the touch panel 2, the main control unit 10 displays the character string thus retrieved in the input character string candidate display area 14. Alternatively, the main control unit 10 may not perform such display until input of characters at a time is completed. After the input of characters at a time is completed, only when a plurality of character strings are retrieved by the character string search processing, the main control unit 10 may display the character strings thus retrieved in the input character string candidate display area 14.

For the matching processing with the dictionary data in the character string search processing explained with reference to FIG. 17, another matching method, such as perfect matching and prefix matching, may be employed. By using an input prediction technology, a character string intended to be input by the user may be predicted, and the character string thus predicted may be treated as the search result. The input prediction technology is a technology in which a character string intended to be input by the user is predicted from character strings that have been already input and a character string that is being input based on the strength of combination of the character string, the frequency of use thereof, and the like.

In the embodiment, when characters are input by the consecutive method, among characters corresponding to buttons displayed on the trajectory along which the finger moves while keeping the touch with the touch panel 2, a character corresponding to a button displayed at a position where a specific gesture is detected is prioritized to identify the input character string. However, the present invention is not limited thereto. A character string including a character corresponding to a button on the trajectory along which the finger moves while keeping the touch with the touch panel 2, or a button displayed in the vicinity thereof may be received as the input character string.

In the embodiment, when characters are input by the consecutive method, the gesture of keeping the touch with the touch panel 2 in a button area, the gesture of pulling the finger away from the touch panel 2 in the button area, and other gestures are described as the specific gesture. However, these gestures are just examples of the specific gesture, and another gesture may be treated as the specific gesture.

Furthermore, the input character display screen 15 and the processing selection screen 16 illustrated in FIG. 2, and the attribute selection screen 17 illustrated in FIG. 18 may be configured such that, if the specific gesture is detected in display areas of a button or an option, the button or the option is selected.

Figure 3:
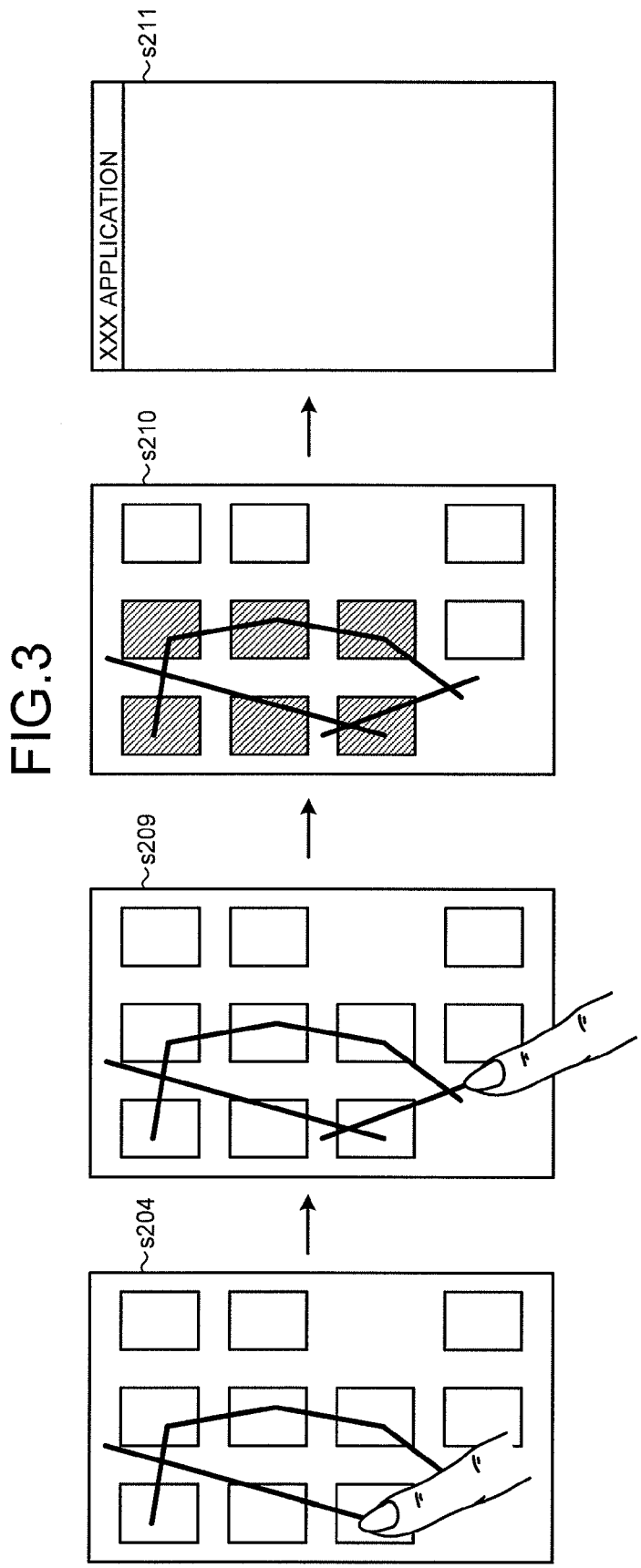
FIG. 3 is a diagram illustrating operations of the mobile phone terminal when character recognition processing fails.

As illustrated in the stage of s209 in FIG. 3, if no character is recognized by the character recognition processing based on the trajectory thus recorded, the mobile phone terminal 1 may shift to a stand-by mode in which received operations are ignored until a predetermined operation is performed on the touch panel 2 or an input unit 3. With this configuration, in the case where the mobile phone terminal 1 is put in a pocket or other cases, it is possible to prevent the touch panel 2 from detecting contact not intended by the user and causing the mobile phone terminal 1 to malfunction.

The invention claimed is:

1. A character input device comprising:
    a touch sensor for detecting contact with respect to a surface thereof;
    a display for displaying a screen on which one or more objects each corresponding to a predetermined processing are arranged so as to be selected; and
    a control unit configured to
        perform, when detection of contact is started on the touch sensor, character recognition processing based on a trajectory connecting each position at which the contact is detected,
        upon a character being recognized by the character recognition processing, perform processing related to the recognized character, and
        upon no character being recognized by the character recognition processing, select an object corresponding to the trajectory connecting each position at which the contact is detected, wherein the selected object corresponds to the position at which the contact is detected first, and the control unit is configured to perform a processing corresponding to only the selected object.

2. The character input device according to claim 1, wherein, upon the character being recognized by the character recognition processing, the control unit is configured to receive the character recognized by the character recognition processing, and display a virtual keyboard on the display for inputting a plurality of characters in a consecutive manner, based on the trajectory connecting each position at which the contact was detected.

3. The character input device according to claim 1, wherein the control unit is configured to defer, while the character recognition processing is performed, performing the processing corresponding to the object arranged at the position at which the contact is detected first, and perform the processing thus deferred when no character is recognized by the character recognition processing.

4. The character input device according to claim 1, wherein the trajectory overlaps more than one of the objects displayed on the display.

5. The character input device according to claim 2, wherein, when the input of the character from the virtual keyboard is completed, the control unit is configured to display a screen for receiving selection of processing performed by using the character recognized by the character recognition processing and the character input from the virtual keyboard.

6. The character input device according to claim 2, wherein, when the input of the character from the virtual keyboard is completed, the control unit is configured to perform processing corresponding to the character recognized by the character recognition processing and the character input from the virtual keyboard.

7. The character input device according to claim 2, wherein, when one of the objects displayed on the display has been selected in advance, the control unit is configured to save a character string obtained by combining the character recognized by the character recognition processing and the character input from the virtual keyboard as attribute information of the object that has been selected in advance.

8. The character input device according to claim 2, wherein, when a character is recognized by the character recognition processing, the control unit is configured to adjust a position at which the virtual keyboard is displayed depending on a position at which the contact is last detected by the touch sensor.

9. The character input device according to claim 2, wherein, when the touch sensor detects a gesture in which contact is started at a first position on the surface of the touch sensor and is terminated at a second position on the surface of the touch sensor while the virtual keyboard is being displayed on the display, the control unit is configured to receive a character string including characters corresponding to buttons of the virtual keyboard displayed on a consecutive input trajectory connecting each position at which the contact is detected from when the contact is started at the first position to when the contact is terminated at the second position as input from the virtual keyboard.

10. The character input device according to claim 9, wherein the control unit is configured to receive the character string including a character corresponding to a button displayed at a position where a specific gesture is detected among the characters corresponding to the buttons displayed on the consecutive input trajectory as the input from the virtual keyboard.

11. A character input method performed by a character input device including a touch sensor for detecting contact with respect to a surface thereof, a display for displaying a screen on which one or more objects each corresponding to a predetermined processing are arranged so as to be selected, and a control unit, the character input method comprising:

performing, when detection of contact is started on the touch sensor, character recognition processing by the control unit based on a trajectory connecting each position at which the contact is detected;

upon a character being recognized by the character recognition processing, performing processing related to the recognized character, and upon no character being recognized by the character recognition processing, selecting an object corresponding to the trajectory connecting each position at which the contact is detected, wherein the selected object corresponds to the position at which the contact is detected first, and the method further comprises performing a processing corresponding to only the selected object.

* * * * *